(12) United States Patent
Sugahara et al.

(10) Patent No.: US 11,848,600 B2
(45) Date of Patent: Dec. 19, 2023

(54) POWER CONVERSION DEVICE WITH CONTROL CIRCUIT TO ADJUST A COMMON MODE VOLTAGE OF COMBINED OUTPUT VOLTAGES

(71) Applicant: Mitsubishi Electric Corporation, Tokyo (JP)

(72) Inventors: Masahiro Sugahara, Tokyo (JP); Kenji Fujiwara, Tokyo (JP); Akihiko Iwata, Tokyo (JP); Hisatoshi Fukumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 228 days.

(21) Appl. No.: 17/424,899

(22) PCT Filed: Feb. 14, 2019

(86) PCT No.: PCT/JP2019/005336
§ 371 (c)(1),
(2) Date: Jul. 22, 2021

(87) PCT Pub. No.: WO2020/166003
PCT Pub. Date: Aug. 20, 2020

(65) Prior Publication Data
US 2022/0131476 A1 Apr. 28, 2022

(51) Int. Cl.
*H02M 7/483* (2007.01)
*H02M 1/12* (2006.01)
*H02M 1/00* (2006.01)

(52) U.S. Cl.
CPC ........... *H02M 1/123* (2021.05); *H02M 1/007* (2021.05); *H02M 7/483* (2013.01)

(58) Field of Classification Search
CPC .............................. H02M 1/123; H02M 1/44
See application file for complete search history.

(56) References Cited

U.S. PATENT DOCUMENTS

2003/0026111 A1 2/2003 Steimer et al.
2019/0044421 A1* 2/2019 Grande, III .............. H02K 5/16

FOREIGN PATENT DOCUMENTS

CN 104506065 A 4/2015
CN 107872167 A 4/2018
(Continued)

OTHER PUBLICATIONS

Extended European search report dated Jan. 24, 2022, in corresponding European patent Application No. 19914835.4, 8 pages.
(Continued)

*Primary Examiner* — Peter M Novak
(74) *Attorney, Agent, or Firm* — XSENSUS LLP

(57) ABSTRACT

A three-phase multilevel inverter is connected to a first direct-current voltage source having a first voltage. Single-phase inverters are each connected in series to a corresponding phase of the three-phase multilevel inverter, and include a second direct-current voltage source, respectively, each having a second voltage. Combined output voltages, which are combinations of boost voltages generated by the three single-phase inverters and output voltages of the three-phase multilevel inverter, are supplied to a load. The control device adjusts a common mode voltage of the combined output voltages to be within a predetermined allowable range, and variation ranges of the line voltages in the combined output voltages to satisfy a specified condition established with the second voltage as a reference.

12 Claims, 19 Drawing Sheets

| No | OUTPUT STATES OF THREE PHASES | | | OUTPUT STATES IN STATIONARY COORDINATE SYSTEM | | COMMON MODE VOLTAGE |
|---|---|---|---|---|---|---|
| | U | V | W | α | β | |
| 1 | 0 | 0 | 0 | 0.00 | 0.00 | 0.00 |
| 2 | 1 | 1 | 1 | 0.00 | 0.00 | 1.00 |
| 3 | -1 | -1 | -1 | 0.00 | 0.00 | -1.00 |
| 4 | 0 | -1 | -1 | 0.82 | 0.00 | -0.67 |
| 5 | 1 | 0 | 0 | 0.82 | 0.00 | 0.33 |
| 6 | 0 | 0 | -1 | 0.41 | 0.71 | -0.33 |
| 7 | 1 | 1 | 0 | 0.41 | 0.71 | 0.67 |
| 8 | 0 | 1 | 0 | -0.41 | 0.71 | 0.33 |
| 9 | -1 | 0 | -1 | -0.41 | 0.71 | -0.67 |
| 10 | 0 | 1 | 1 | -0.82 | 0.00 | 0.67 |
| 11 | -1 | 0 | 0 | -0.82 | 0.00 | -0.33 |
| 12 | 0 | 0 | 1 | -0.41 | -0.71 | 0.33 |
| 13 | -1 | -1 | 0 | -0.41 | -0.71 | -0.67 |
| 14 | 0 | -1 | 0 | 0.41 | -0.71 | -0.33 |
| 15 | 1 | 0 | 1 | 0.41 | -0.71 | 0.67 |
| 16 | 1 | 0 | -1 | 1.22 | 0.71 | 0.00 |
| 17 | 0 | 1 | -1 | 0.00 | 1.41 | 0.00 |
| 18 | -1 | 1 | 0 | -1.22 | 0.71 | 0.00 |
| 19 | -1 | 0 | 1 | -1.22 | -0.71 | 0.00 |
| 20 | 0 | -1 | 1 | 0.00 | -1.41 | 0.00 |
| 21 | 1 | -1 | 0 | 1.22 | -0.71 | 0.00 |
| 22 | 1 | -1 | -1 | 1.63 | 0.00 | -0.33 |
| 23 | 1 | 1 | -1 | 0.82 | 1.41 | 0.33 |
| 24 | -1 | 1 | -1 | -0.82 | 1.41 | -0.33 |
| 25 | -1 | 1 | 1 | -1.63 | 0.00 | 0.33 |
| 26 | -1 | -1 | 1 | -0.82 | -1.41 | -0.33 |
| 27 | 1 | -1 | 1 | 0.82 | -1.41 | 0.33 |

(56) References Cited

FOREIGN PATENT DOCUMENTS

EP       1253706  A1    10/2002
EP       2713498  A1     4/2014
JP     2007-37355  A     2/2007

OTHER PUBLICATIONS

Martin Veenstra et al., "Control of a Hybrid Asymmetric Multilevel Inverter for Competitive Medium-Voltage Industrial Drives", IEEE Transactions on Industry Applications, vol. 41, No. 2, Mar./Apr. 2005, pp. 655-664, XP11129530.
International Search Report and Written Opinion dated Apr. 16, 2019, received for PCT Application PCT/JP2019/005336, Filed on Feb. 14, 2019, 8 pages including English Translation.
European Office Action dated May 11, 2023 in corresponding European Patent Application No. 19 914 835.4, 5 pages.

\* cited by examiner

FIG.11

|  | OUTPUT PHASE VOLTAGES OF SINGLE-PHASE INVERTER | | | OUTPUT LINE VOTAGES OF SINGLE-PHASE INVERTER | | | VARIATION RANGES OF OUTPUT LINE VOTAGES OF SINGLE-PHASE INVERTER | | |
|---|---|---|---|---|---|---|---|---|---|
|  | U TVa | V TVb | W TVc | UV EVab | VW EVbc | WU EVca | $\Delta$UV $\Delta$EVab | $\Delta$VW $\Delta$EVbc | $\Delta$WU $\Delta$EVca |
| STATE 1 | 0 | 1 | 0 | -1 | 1 | 0 | — | — | — |
| STATE 2 | 0 | 0 | 1 | 0 | -1 | 1 | 1 | -2 | 1 |

FIG.12

|  | OUTPUT PHASE VOLTAGES OF SINGLE-PHASE INVERTER | | | OUTPUT LINE VOTAGES OF SINGLE-PHASE INVERTER | | | VARIATION RANGES OF OUTPUT LINE VOTAGES OF SINGLE-PHASE INVERTER | | |
|---|---|---|---|---|---|---|---|---|---|
|  | U TVa | V TVb | W TVc | UV EVab | VW EVbc | WU EVca | $\Delta$UV $\Delta$EVab | $\Delta$VW $\Delta$EVbc | $\Delta$WU $\Delta$EVca |
| STATE 1 | 0 | 1 | 0 | -1 | 1 | 0 | — | — | — |
| STATE 1A | 0 | 0 | 0 | 0 | 0 | 0 | 1 | -1 | 0 |
| STATE 2 | 0 | 0 | 1 | 0 | -1 | 1 | 0 | 1 | 1 |

FIG.16

| No | OUTPUT STATES OF THREE PHASES | | | OUTPUT STATES IN STATIONARY COORDINATE SYSTEM | | COMMON MODE VOLTAGE |
|---|---|---|---|---|---|---|
| | U | V | W | α | β | |
| 1 | 0 | 0 | 0 | 0.00 | 0.00 | 0.00 |
| 2 | 1 | 1 | 1 | 0.00 | 0.00 | 1.00 |
| 3 | -1 | -1 | -1 | 0.00 | 0.00 | -1.00 |
| 4 | 0 | -1 | -1 | 0.82 | 0.00 | -0.67 |
| 5 | 1 | 0 | 0 | 0.82 | 0.00 | 0.33 |
| 6 | 0 | 0 | -1 | 0.41 | 0.71 | -0.33 |
| 7 | 1 | 1 | 0 | 0.41 | 0.71 | 0.67 |
| 8 | 0 | 1 | 0 | -0.41 | 0.71 | 0.33 |
| 9 | -1 | 0 | -1 | -0.41 | 0.71 | -0.67 |
| 10 | 0 | 1 | 1 | -0.82 | 0.00 | 0.67 |
| 11 | -1 | 0 | 0 | -0.82 | 0.00 | -0.33 |
| 12 | 0 | 0 | 1 | -0.41 | -0.71 | 0.33 |
| 13 | -1 | -1 | 0 | -0.41 | -0.71 | -0.67 |
| 14 | 0 | -1 | 0 | 0.41 | -0.71 | -0.33 |
| 15 | 1 | 0 | 1 | 0.41 | -0.71 | 0.67 |
| 16 | 1 | 0 | -1 | 1.22 | 0.71 | 0.00 |
| 17 | 0 | 1 | -1 | 0.00 | 1.41 | 0.00 |
| 18 | -1 | 1 | 0 | -1.22 | 0.71 | 0.00 |
| 19 | -1 | 0 | 1 | -1.22 | -0.71 | 0.00 |
| 20 | 0 | -1 | 1 | 0.00 | -1.41 | 0.00 |
| 21 | 1 | -1 | 0 | 1.22 | -0.71 | 0.00 |
| 22 | 1 | -1 | -1 | 1.63 | 0.00 | -0.33 |
| 23 | 1 | 1 | -1 | 0.82 | 1.41 | 0.33 |
| 24 | -1 | 1 | -1 | -0.82 | 1.41 | -0.33 |
| 25 | -1 | 1 | 1 | -1.63 | 0.00 | 0.33 |
| 26 | -1 | -1 | 1 | -0.82 | -1.41 | -0.33 |
| 27 | 1 | -1 | 1 | 0.82 | -1.41 | 0.33 |

FIG.17

| No | OUTPUT STATES OF THREE PHASES | | | OUTPUT STATES IN STATIONARY COORDINATE SYSTEM | | COMMON MODE VOLTAGE |
|---|---|---|---|---|---|---|
| | U | V | W | α | β | |
| 1 | 0 | 0 | 0 | 0.00 | 0.00 | 0.00 |
| 2 | 1 | 1 | 1 | 0.00 | 0.00 | 1.00 |
| 3 | -1 | -1 | -1 | 0.00 | 0.00 | -1.00 |
| 4 | 0 | -1 | -1 | 0.41 | 0.00 | -0.67 |
| 5 | 1 | 0 | 0 | 0.41 | 0.00 | 0.33 |
| 6 | 0 | 0 | -1 | 0.20 | 0.35 | -0.33 |
| 7 | 1 | 1 | 0 | 0.20 | 0.35 | 0.67 |
| 8 | 0 | 1 | 0 | -0.20 | 0.35 | 0.33 |
| 9 | -1 | 0 | -1 | -0.20 | 0.35 | -0.67 |
| 10 | 0 | 1 | 1 | -0.41 | 0.00 | 0.67 |
| 11 | -1 | 0 | 0 | -0.41 | 0.00 | -0.33 |
| 12 | 0 | 0 | 1 | -0.20 | -0.35 | 0.33 |
| 13 | -1 | -1 | 0 | -0.20 | -0.35 | -0.67 |
| 14 | 0 | -1 | 0 | 0.20 | -0.35 | -0.33 |
| 15 | 1 | 0 | 1 | 0.20 | -0.35 | 0.67 |
| 16 | 1 | 0 | -1 | 0.61 | 0.35 | 0.00 |
| 17 | 0 | 1 | -1 | 0.00 | 0.71 | 0.00 |
| 18 | -1 | 1 | 0 | -0.61 | 0.35 | 0.00 |
| 19 | -1 | 0 | 1 | -0.61 | -0.35 | 0.00 |
| 20 | 0 | -1 | 1 | 0.00 | -0.71 | 0.00 |
| 21 | 1 | -1 | 0 | 0.61 | -0.35 | 0.00 |
| 22 | 1 | -1 | -1 | 0.82 | 0.00 | -0.33 |
| 23 | 1 | 1 | -1 | 0.41 | 0.71 | 0.33 |
| 24 | -1 | 1 | -1 | -0.41 | 0.71 | -0.33 |
| 25 | -1 | 1 | 1 | -0.62 | 0.00 | 0.33 |
| 26 | -1 | -1 | 1 | -0.41 | -0.71 | -0.33 |
| 27 | 1 | -1 | 1 | 0.41 | -0.71 | 0.33 |

POWER CONVERSION DEVICE WITH CONTROL CIRCUIT TO ADJUST A COMMON MODE VOLTAGE OF COMBINED OUTPUT VOLTAGES

CROSS-REFERENCE TO RELATED APPLICATION

The present application is based on PCT filing PCT/JP2019/005336, filed Feb. 14, 2019, the entire contents of which are incorporated herein by reference.

TECHNICAL FIELD

The present invention relates to a power conversion device.

BACKGROUND ART

A variable speed drive apparatus or the like, in which the motor is driven by an inverter, has a long cable between the inverter and the motor. Thus, a high voltage change upon switching of the inverter causes a voltage spike at the input terminal of the motor, which can degrade the lifetime of the motor.

Driving the motor with an inverter causes the neutral potential fluctuation of the motor, which causes a zero-phase current to flow through the apparatus via stray capacitances of the cable and the motor. As a result, a common mode noise generated by the zero-phase current may negatively impact peripheral devices.

The power conversion device disclosed in PTL 1 includes a three-phase inverter, and three single-phase inverters connected to the three-phase inverter. The power conversion device controls the sum of output voltages of the three phases to be 0[V], thereby suppressing the common mode noise.

CITATION LIST

Patent Literature

PTL 1: Japanese Patent Laying-Open No. 2007-037355

SUMMARY OF INVENTION

Technical Problem

An electro magnetic interference (EMI) noise caused by a power conversion device includes a common mode noise and a normal mode noise. The power conversion device disclosed in PTL 1 suppresses the common mode noise by controlling the common mode voltage to be 0[V], but does not reduce the normal mode noise.

Therefore, an object of the present invention is to provide a power conversion device which reduces both the common mode noise and the normal mode noise.

Solution to Problem

A power conversion device according to the present invention includes: a three-phase multilevel inverter connected to a first direct-current voltage source having a first voltage; three single-phase inverters, each single-phase inverter connected in series to a corresponding phase of the three-phase multilevel inverter and including a second direct-current voltage source having a second voltage; and a control device. Combined output voltages, which are combinations of boost voltages generated by the three single-phase inverters and output voltages of the three-phase multilevel inverter, are supplied to a load. The control device adjusts a common mode voltage of the combined output voltages to be within a predetermined allowable range and a variation range of each line voltage in the combined output voltages to satisfy a specified condition established with the second voltage as a reference.

Advantageous Effects of Invention

According to the present invention, the control device adjusts the common mode voltage of the combined output voltage to fall within the predetermined allowable range, and the variation range of each line voltage in the combined output voltage to satisfy the specified condition established with the second voltage as a reference. This can reduce both the common mode noise and the normal mode noise.

BRIEF DESCRIPTION OF DRAWINGS

FIG. 11 is a diagram for illustrating variation ranges of line voltages not having through a line voltage variation range suppression control.

FIG. 12 is a diagram for illustrating variation ranges of the line voltages having through the line voltage variation range suppression control.

FIG. 16 is a diagram representing states of outputs of the three phases of three-phase three-level inverter 5, states of outputs in a stationary coordinate system, and common mode voltage Vcom1.

FIG. 17 is a diagram representing states of outputs of the three phases of single-phase inverters 10-a, 10-b, and 10-c, states of outputs in a stationary coordinate system, and common mode voltage Vcom2.

DESCRIPTION OF EMBODIMENTS

Hereinafter, embodiments will be described, with reference to the accompanying drawings.

Embodiment 1

Figure 1:
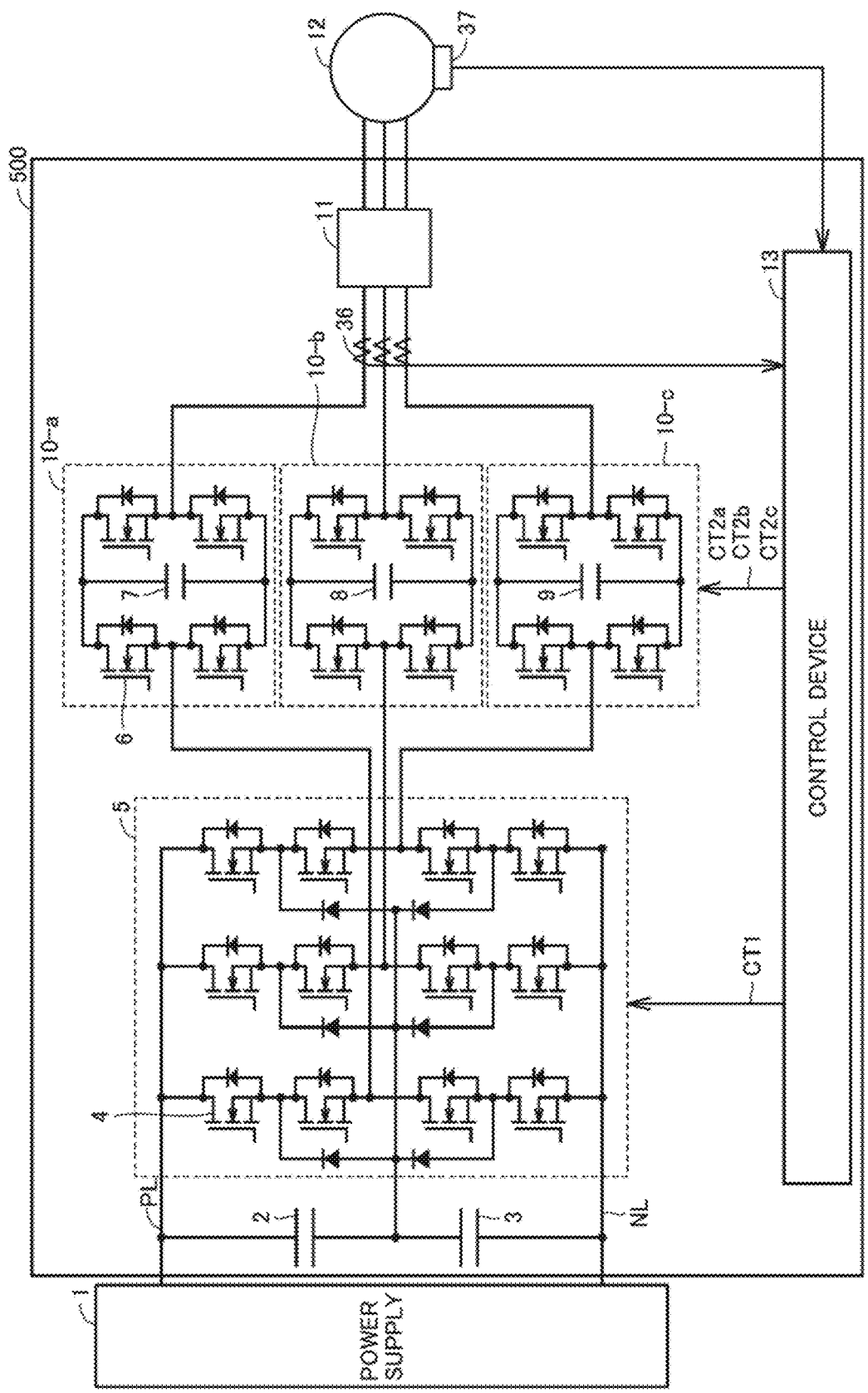
FIG. 1 is a diagram representing a configuration of a power conversion device 500 according to Embodiment 1.

FIG. 1 is a diagram representing a configuration of a power conversion device 500 according to Embodiment 1.

Power conversion device 500 includes a first input capacitor 2, a second input capacitor 3, a three-phase three-level inverter 5, single-phase inverters 10, current sensors 36, an EMI noise filter 11, and a control device 13.

A direct-current power supply 1 corresponds to a first direct-current voltage source. A voltage of direct-current power supply 1 corresponds to a first voltage VM.

First input capacitor 2 and second input capacitor 3 are connected in series between a positive busbar PL and a negative busbar NL. First input capacitor 2 and second input capacitor 3 divide first voltage VM of direct-current power supply 1.

Three-phase three-level inverter 5 includes multiple switching elements 4 and multiple diodes. Switching element 4 is, for example, a Si-IGBT (Insulated Gate Bipolar Transistor), a Si-MOSFET (Metal Oxide Semiconductor Field Effect Transistor), a SiC-IGBT, a SiC-MOSFET, or the like. The diode is, for example, a Si-Diode, a SiC-Diode, or the like. A diode is connected in anti-parallel to switching element 4.

Control device 13 drives any one of switching elements 4 included in three-phase three-level inverter 5, thereby outputting any one of the voltage of first input capacitor 2, the voltage of second input capacitor 3, and the voltage at the point of connection between first input capacitor 2 and second input capacitor 3.

A single-phase inverter 10-a is connected in series to the U phase of three-phase three-level inverter 5. A single-phase inverter 10-b is connected in series to the V phase of three-phase three-level inverter 5. A single-phase inverter 10-c is connected in series to the W phase of three-phase three-level inverter 5.

Single-phase inverters 10-*a*, 10-*b*, and 10-*c* each include four switching elements 6 and four diodes. Switching element 6 is, for example, a Si-IGBT, a Si-MOSFET, a SiC-IGBT, a SiC-MOSFET, or the like. The diode is a Si-Diode, a SiC-Diode, or the like. A diode is connected in anti-parallel to switching element 6.

Single-phase inverter 10-*a* includes a third input capacitor 7. Single-phase inverter 10-*b* includes a fourth input capacitor 8. Single-phase inverter 10-*c* includes a fifth input capacitor 9.

Single-phase inverter 10-*a* may include multiple stages connected in series, each stage being configured of four switching elements 6, four diodes, and third input capacitor 7. In this case, the front end of the stages is connected to the U phase of three-phase three-level inverter 5, and the back end of the stages is connected to a load 12 via EMI noise filter 11.

Single-phase inverter 10-*b* may include multiple stages connected in series, each stage being configured of four switching elements 6, four diodes, and fourth input capacitor 8. In this case, the front end of the stages is connected to the V phase of three-phase three-level inverter 5, and the back end of the stages is connected to load 12 via EMI noise filter 11.

Single-phase inverter 10-*c* may include multiple stages connected in series, each stage being configured of four switching elements 6, four diodes, and fifth input capacitor 9. In this case, the front end of the stages is connected to the W phase of three-phase three-level inverter 5, and the back end of the stages is connected to load 12 via EMI noise filter 11.

Third input capacitor 7, fourth input capacitor 8, and fifth input capacitor 9 correspond to a second direct-current voltage source. Voltages of third input capacitor 7, fourth input capacitor 8, and fifth input capacitor 9 correspond to a second voltage Vs.

Control device 13 drives any of switching elements 6 included in single-phase inverters 10-*a*, 10-*b*, and 10-*c*, thereby causing single-phase inverters 10-*a*, 10-*b*, and 10-*c* to generate boost voltages TVa, TVb, and TVc at any of three levels $\{-Vs, 0, +Vs\}$.

EMI noise filter 11 is configured of a normal mode noise filter and a common mode noise filter.

Load 12 is, for example, a three-phase motor.

A current sensor 36 detects the current flowing between single-phase inverters 10-*a*, 10-*b*, and 10-*c* and load 12.

Boost voltage TVa generated by single-phase inverter 10-*a* is superimposed on a U-phase output voltage V_a of three-phase three-level inverter 5 and a combined output voltage CVa is thereby generated, which is then supplied to load 12 as a U-phase output voltage of power conversion device 500. Boost voltage TVb generated by single-phase inverter 10-*b* is superimposed on a V-phase output voltage V_b of three-phase three-level inverter 5, and a combined output voltage CVb is thereby generated, which is then supplied to load 12 as a V-phase output voltage of power conversion device 500. Boost voltage TVc generated by single-phase inverter 10-*c* is superimposed on a W-phase output voltage V_c of three-phase three-level inverter 5, and a combined output voltage CVc is thereby generated, which is then supplied to load 12 as a W-phase output voltage of power conversion device 500.

Figure 2:
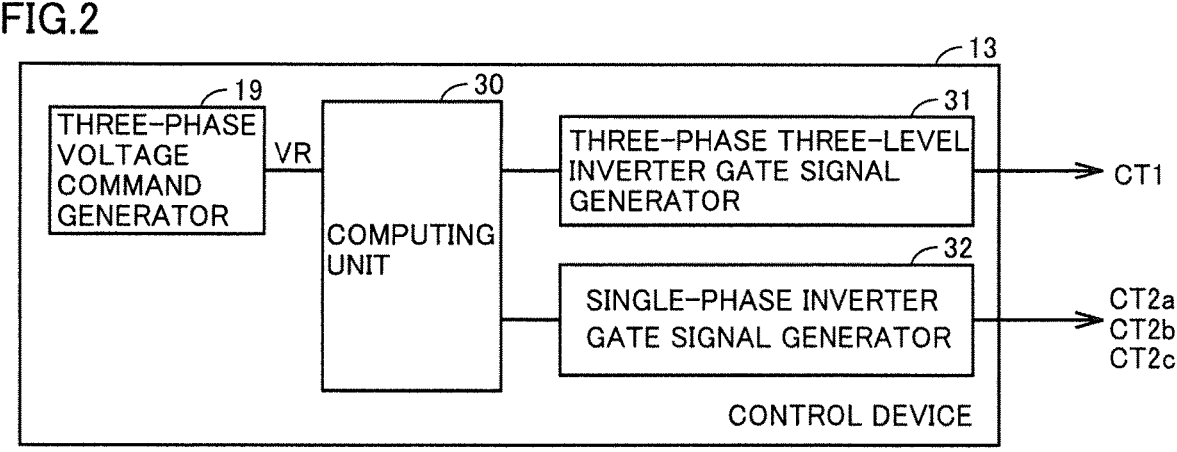
FIG. 2 is a diagram showing a configuration of a control device 13 according to Embodiment 1.

FIG. 2 is a diagram showing a configuration of control device 13 according to Embodiment 1.

Control device 13 includes a three-phase voltage command generator 19, a computing unit 30, a three-phase three-level inverter gate signal generator 31, and a single-phase inverter gate signal generator 32.

Three-phase voltage command generator 19 generates a three-phase voltage command value VR. For example, three-phase voltage command generator 19 generates three-phase voltage command value VR by performing PI control based on a deviation between the load current of the motor obtained by current sensor 36 and a current command value. Alternatively, three-phase voltage command generator 19 generates three-phase voltage command value VR by performing PI control based on a deviation between the rpm of the motor obtained by a speed sensor 37 and a speed command value.

Using the concept of instantaneous spatial voltage vector, computing unit 30 suppresses a common mode voltage Vcom3 of combined output voltages CVa, CVb, and CVc, and reduce the variation ranges of line voltages DVab, DVbc, and DVca between combined output voltages CVa, CVb, and CVc.

Common mode voltage Vcom3, and line voltages DVab, DVbc, and DVca are represented by the following equations.

$$Vcom3=CVa+CVb+CVc \quad (A1)$$

$$DVab=CVb-CVa \quad (A2)$$

$$DVbc=CVc-CVb \quad (A3)$$

$$DVca=CVa-CVc \quad (A4)$$

Here, since common mode voltage Vcom3 and the variation ranges of line voltages DVab, DVbc, and DVca are in trade-off, the pattern of selection of vectors of combined output voltages CVa, CVb, and CVc depends on whether common mode voltage Vcom3 is prioritized or the variation ranges of line voltages DVab, DVbc, and DVca are prioritized, or how much the common mode voltage Vcom3 and the variation ranges of line voltages DVab, DVbc, and DVca are to be suppressed.

Computing unit 30 adjusts combined output voltages CVa, CVb, and CVc so that they satisfy a first condition and a second condition.

The first condition is that "common mode voltage Vcom3 of combined output voltages CVa, CVb, and CVc is within a predetermined range." The "second condition" is that "the variation ranges of line voltages DVab, DVbc, and DVca between combined output voltages CVa, CVb, and CVc is a specified condition established with second voltage Vs as a reference."

In the present embodiment, suppose that the first condition is that "common mode voltage Vcom3 of combined output voltages CVa, CVb, and CVc is suppressed to $\frac{2}{3}$ or below the second voltage Vs," and "the second condition" is that "the variation ranges of line voltages DVab, DVbc, and DVca between combined output voltages CVa, CVb, and CVc are suppressed to second voltage Vs or below."

In other words, computing unit 30 adjusts common mode voltage Vcom3 of combined output voltages CVa, CVb, and CVc to be suppressed to $\frac{2}{3}$ or below the second voltage Vs, and the variation ranges of line voltages DVab, DVbc, and DVca between combined output voltages CVa, CVb, and CVc to be suppressed to second voltage Vs or below.

Figure 3:
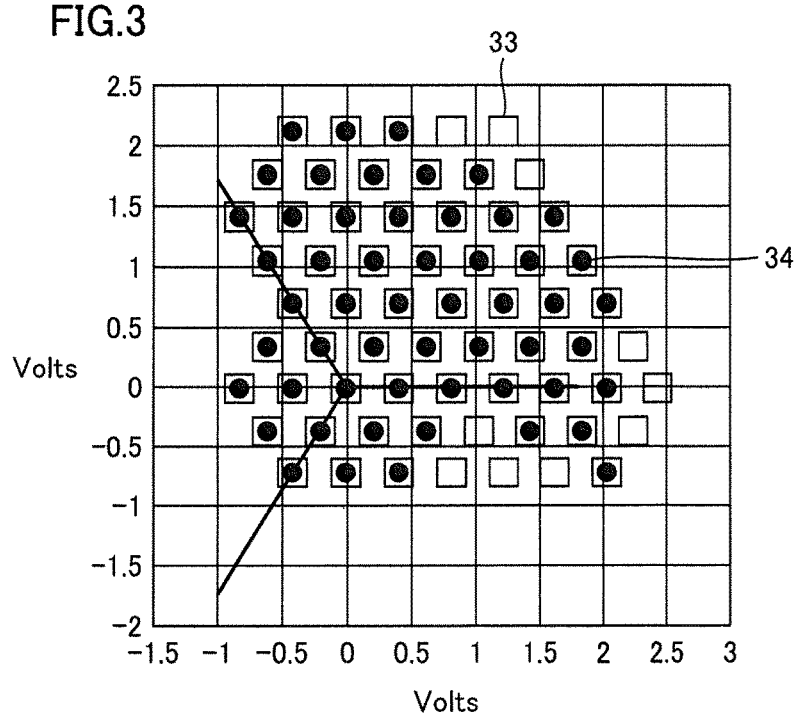
FIG. 3 is a diagram showing some of vectors of combined output voltages CVa, CVb, and CVc, according to Embodiment 1.

FIG. 3 is a diagram showing some of vectors of combined output voltages CVa, CVb, and CVc, according to Embodiment 1.

Some of vectors 33 of combined output voltages CVa, CVb, and CVc are shown. Among vectors 33 of combined output voltages CVa, CVb, and CVc, some of vectors 34 of combined output voltages CVa, CVb, and CVc are shown which allow common mode voltage Vcom3 of combined output voltages CVa, CVb, and CVc to be suppressed to ⅔ or below the second voltage Vs and the variation ranges of line voltages DVab, DVbc, and DVca between combined output voltages CVa, CVb, and CVc to be suppressed to second voltage Vs or below.

Computing unit 30 selects three or more vectors 34 of combined output voltages CVa, CVb, and CVc that are closest to three-phase voltage command value VR that is output from three-phase voltage command generator 19 within a certain control cycle. Computing unit 30 temporally distributes the selected vectors of combined output voltages CVa, CVb, and CVc, thereby adjusting an average of the temporal distribution to be a time average of three-phase voltage command value VR. This suppresses common mode voltage Vcom3 of combined output voltages CVa, CVb, and CVc to ⅔ or below the second voltage Vs, and suppresses the variation ranges of line voltages DVab, DVbc, and DVca between combined output voltages CVa, CVb, and CVc to second voltage Vs or below.

Three-phase three-level inverter gate signal generator 31 outputs a gate signal CT1 for three-phase three-level inverter 5, thereby controlling three-phase three-level inverter 5.

Single-phase inverter gate signal generator 32 outputs a gate signal CT2a for single-phase inverter 10-a, a gate signal CT2b for single-phase inverter 10-b, and a gate signal CT2c for single-phase inverter 10-c, thereby controlling three-phase three-level inverter 5.

According to the present embodiment, since common mode voltage Vcom3 of combined output voltages CVa, CVb, and CVc is suppressed to ⅔ or below the second voltage Vs, common mode voltage Vcom3 can be reduced. Since the variation ranges of line voltages DVab, DVbc, and DVca between combined output voltages CVa, CVb, and CVc are suppressed to second voltage Vs or below, the normal mode noise can be reduced too. This allows reduction in size and weight of an EMI filter that is configured of the common mode noise filter and the normal mode noise filter.

Embodiments 2

A power conversion device 500 according to Embodiments 2 is the same as power conversion device 500 according to Embodiment 1, except for the processing content of a computing unit 30 included in a control device 13.

In the present embodiment, a computing unit 30 selects vectors of combined output voltages CVa, CVb, and CVc so that a "first condition" (=common mode voltage Vcom3 of combined output voltages CVa, CVb, and CVc is within a predetermined range") and a "second condition" (the variation ranges of line voltages DVab, DVbc, and DVca between combined output voltages CVa, CVb, and CVc is a specified condition established with a second voltage Vs as a reference) are satisfied, as with Embodiment 1.

In the present embodiment, the first condition is that "common mode voltage Vcom3 of combined output voltages CVa, CVb, and CVc is suppressed to 0V, and the "second condition" is that "the variation ranges of line voltages DVab, DVbc, and DVca between combined output voltages CVa, CVb, and CVc are suppressed to twice the second voltage Vs."

In other words, computing unit 30 adjusts common mode voltage Vcom3 of combined output voltages CVa, CVb, and CVc to be suppressed to 0[V], and the variation ranges of line voltages DVab, DVbc, and DVca between combined output voltages CVa, CVb, and CVc to be suppressed to twice the second voltage Vs.

Figure 4:
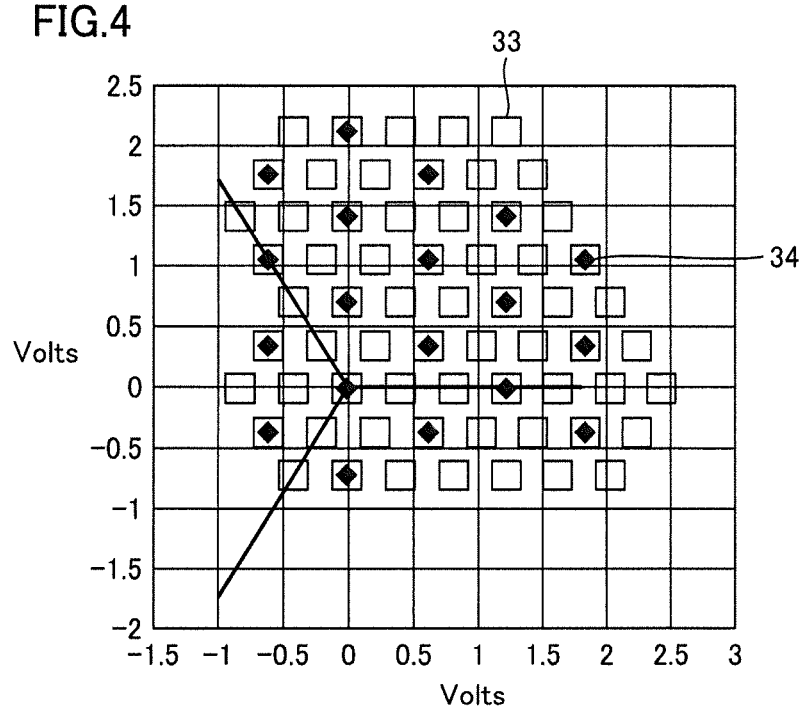
FIG. 4 is a diagram showing some of vectors of combined output voltages CVa, CVb, and CVc, according to Embodiments 2.

FIG. 4 is a diagram showing some of vectors of combined output voltages CVa, CVb, and CVc, according to Embodiments 2.

Some of vector 33 of combined output voltages CVa, CVb, and CVc are shown. Among vectors 33 of combined output voltages CVa, CVb, and CVc, some of vectors 35 of combined output voltages CVa, CVb, and CVc are shown which allows common mode voltage Vcom3 of combined output voltages CVa, CVb, and CVc to be suppressed to 0[V] and the variation ranges of line voltages DVab, DVbc, and DVca between combined output voltages CVa, CVb, and CVc to be suppressed to twice the second voltage Vs.

Computing unit 30 selects three or more vectors 35 of combined output voltages CVa, CVb, and CVc that are closest to a three-phase voltage command value VR that is output from a three-phase voltage command generator 19 within a certain control cycle. Computing unit 30 temporally distributes the selected vectors 35 of combined output voltages CVa, CVb, and CVc, thereby adjusting an average of the temporal distribution to be a time average of three-phase voltage command value VR. This suppresses common mode voltage Vcom3 of combined output voltages CVa, CVb, and CVc to 0[V], and the variation ranges of line voltages DVab, DVbc, and DVca between combined output voltages CVa, CVb, and CVc to be twice the second voltage Vs.

According to the present embodiment, since common mode voltage Vcom3 of combined output voltages CVa, CVb, and CVc is suppressed to 0[V], common mode voltage Vcom3 can be reduced. Since the variation ranges of line voltages DVab, DVbc, and DVca between combined output voltages CVa, CVb, and CVc are suppressed to twice the second voltage Vs, the normal mode noise can be reduced too. This allows reduction in size and weight of an EMI filter that is configured of a common mode noise filter and a normal mode noise filter.

Note that, as the first condition, control device 13 may employ a condition that "common mode voltage Vcom3 of combined output voltages CVa, CVb, and CVc is suppressed to ¹⁄₁₀ or below the second voltage Vs," instead of "common mode voltage Vcom3 of combined output voltages CVa, CVb, and CVc is suppressed to 0V." Operationally, this allows control device 13 to deal even with generation of a slight amount of common mode voltage Vcom3 that is caused by delays in switching of the switching elements, variations in switching elements, a dead time, etc.

In the above description, suppressing common mode voltage Vcom3 to 0[V] and suppressing the variation ranges of line voltages DVab, DVbc, and DVca to twice the second voltage Vs respectively include suppressing common mode voltage Vcom3 to substantially 0[V] and suppressing the variation ranges of line voltages DVab, DVbc, and DVca to substantially twice the second voltage Vs. In other words, the values of the above voltages, even if they have small differences in numerical value, are within the scope of the present invention.

Embodiment 3

A power conversion device 500 according to Embodiment 3 is a refinement of power conversion device 500 according to Embodiment 1.

In Embodiment 3, computing unit 30 adjusts a common mode voltage Vcom3 of combined output voltages CVa, CVb, and CVc to be suppressed to ⅔ or below a second voltage Vs, and the variation ranges of line voltages DVab, DVbc, and DVca between combined output voltages CVa, CVb, and CVc to be suppressed to second voltage Vs or below, as with Embodiment 1.

Figure 5:
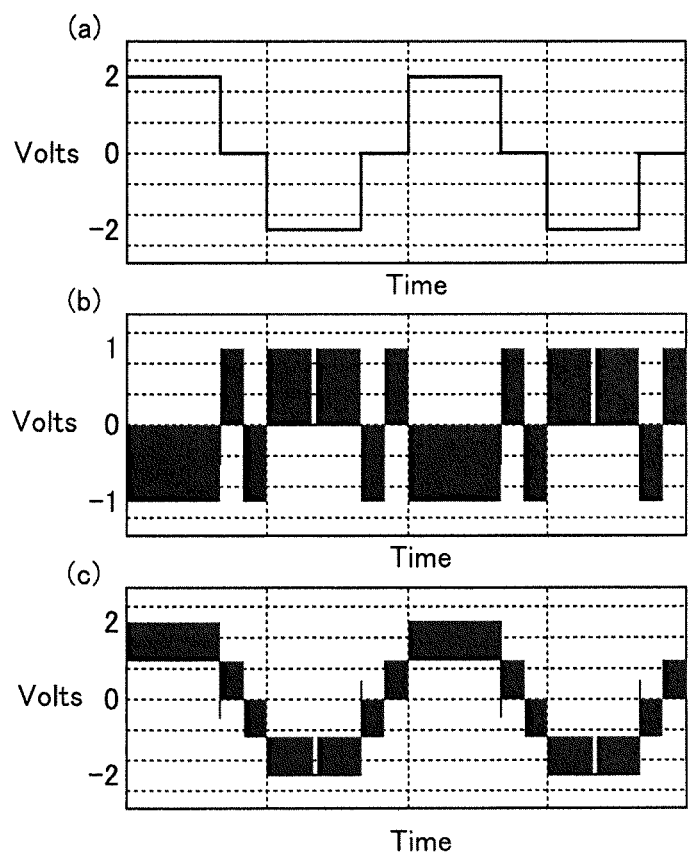
FIG. 5 shows: (a) a diagram representing a U-phase output voltage V_a of a three-phase three-level inverter 5; (b) a diagram representing a boost voltage TVa generated by a single-phase inverter 10-a; and (c) a diagram representing a combined output voltage CVa.

Part (a) of FIG. 5 is a diagram representing a U-phase output voltage V_a of a three-phase three-level inverter 5. Part (b) of FIG. 5 is a diagram representing a boost voltage TVa generated by a single-phase inverter 10-*a*. Part (c) of FIG. 5 is a diagram representing a combined output voltage CVa.

As shown in (a) of FIG. 5, three-phase three-level inverter 5 outputs a voltage to be the fundamental wave of a load 12, such as an square wave output of one pulse, and supplies the real power to load 12.

The output voltage of single-phase inverter 10 is a voltage that is generated by performing pulse width modulation (PWM) on a voltage command, the voltage command being a difference between a target output voltage and the output voltage of three-phase three-level inverter 5. Thus, as shown in (b) of FIG. 5, the output voltage of single-phase inverter 10 is a pulsating voltage.

As shown in (c) of FIG. 5, combined output voltage CVa is a voltage in which an output voltage of single-phase inverter 10-*a* is superimposed on U-phase output voltage V_a.

First voltage VM and second voltage Vs are set to be in a ratio of 2:1. This causes three-phase three-level inverter 5 having a high direct-current voltage to switch at a low frequency, and single-phase inverter 10 having a low direct-current voltage to switch at a high speed. This reduces switching losses of power conversion device 500, leading to an increased efficiency of power conversion device 500.

Figure 6:
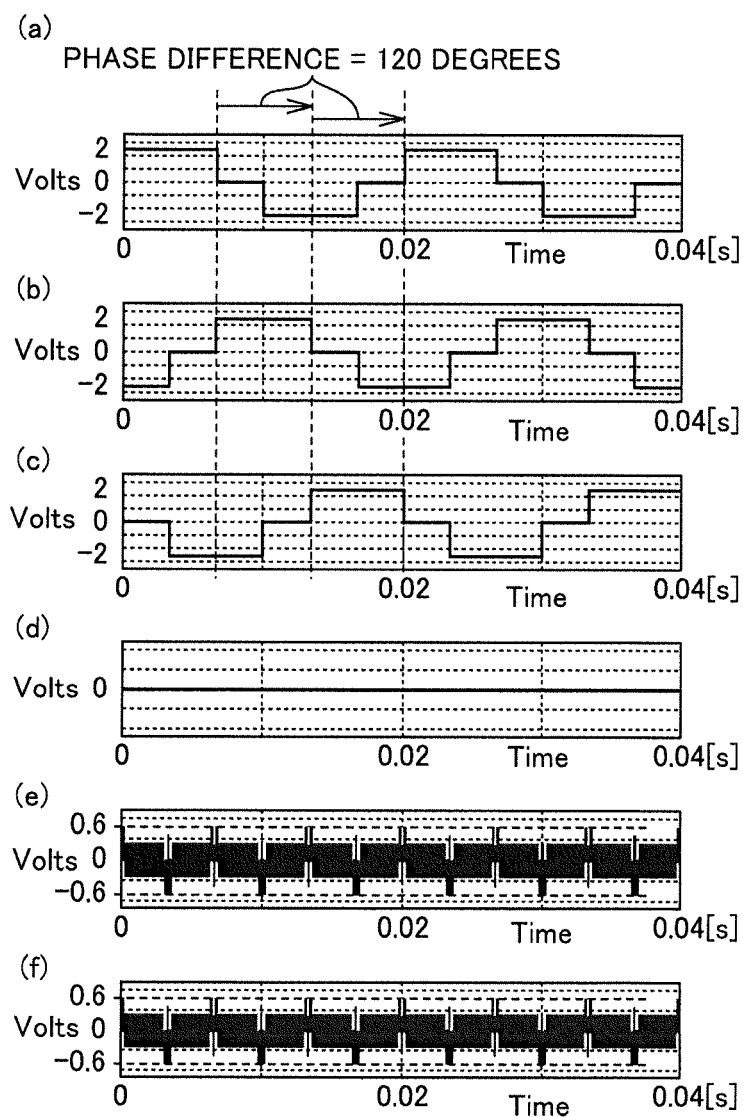
FIG. 6 shows: (a) a diagram representing a U-phase output voltage V_a of three-phase three-level inverter 5; (b) a diagram representing a V-phase output voltage V_b of three-phase three-level inverter 5; (c) a diagram representing a W-phase output voltage V_c of three-phase three-level inverter 5; (d) a diagram representing a common mode voltage Vcom1 of output voltages V_a, V_b, and V_c of three-phase three-level inverter 5; (e) a diagram representing a common mode voltage Vcom2 of boost voltages TVa, TVb, and TVc generated by single-phase inverter 10; and (f) a diagram representing a common mode voltage Vcom3 of combined output voltages CVa, CVb, and CVc.

Part (a) of FIG. 6 is a diagram representing U-phase output voltage V_a of three-phase three-level inverter 5. Part (b) of FIG. 6 is a diagram representing a V-phase output voltage V_b of three-phase three-level inverter 5. Part (c) of FIG. 6 is a diagram representing a W-phase output voltage V_c of three-phase three-level inverter 5.

U-phase output voltage V_a, V-phase output voltage V_b, and W-phase output voltage V_c each have a phase difference from the other two by 120 degrees.

Part (d) of FIG. 6 is a diagram representing a common mode voltage Vcom1 of output voltages V_a, V_b, and V_c of three-phase three-level inverter 5.

Common mode voltage Vcom1 can be represented by:

$$Vcom1=(V\_a+V\_b+V\_c)/3 \tag{B1}$$

As indicated by Equation (B1), if the sum of the three phase voltages V_a, V_b, and V_c is always 0[V], common mode voltage Vcom1 is 0[V] as well.

Control device 13 switches switching elements 4 of three-phase level inverter 5 so that the sum of three phase voltages V_a, V_b, and V_c is always 0[V], thereby controlling common mode voltage Vcom1 to be 0[V].

Part (e) of FIG. 6 is a diagram representing a common mode voltage Vcom2 of boost voltages TVa, TVb, and TVc which are generated by single-phase inverter 10.

Common mode voltage Vcom2 can be represented by:

$$Vcom2=(TVa+TVb+TVc)/3 \tag{B2}$$

Since control device 13 does not control common mode voltage Vcom2 of the output voltages of single-phase inverters 10-*a*, 10-*b*, and 10-*c*, common mode voltage Vcom2 is not 0[V].

Part (f) of FIG. 6 is a diagram representing a common mode voltage Vcom3 of combined output voltages CVa, CVb, and CVc.

The following equation stands true, and thus common mode voltage Vcom3 is not 0[V].

$$Vcom3=Vcom1+Vcom2 \tag{B3}$$

Figure 7:
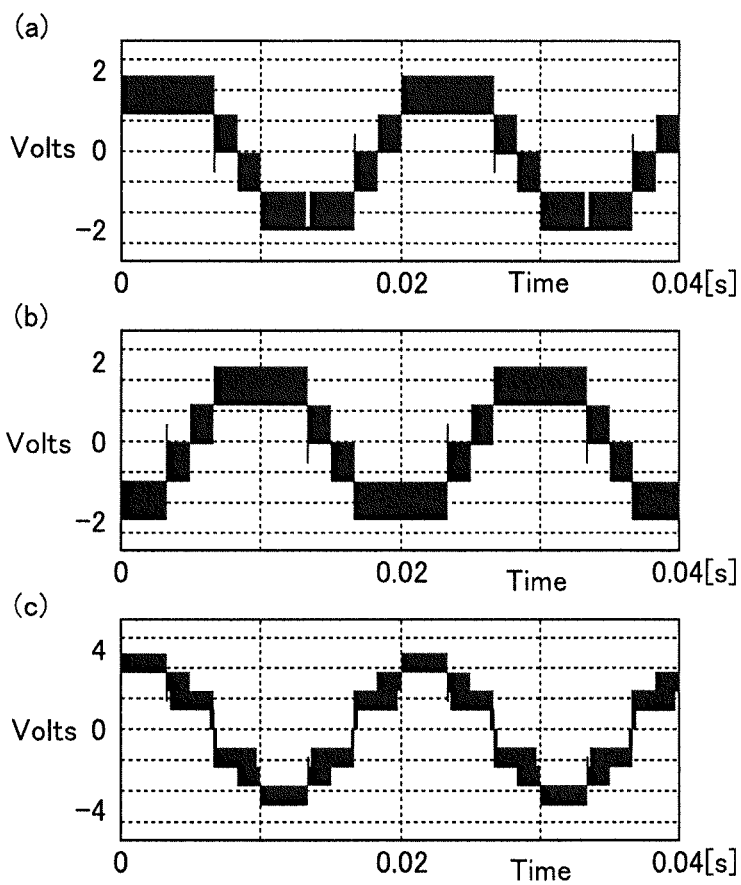
FIG. 7 shows: (a) a diagram representing combined output voltage CVa; (b) a diagram representing combined output voltage CVb; and (c) a diagram representing a line voltage DVab.

Part (a) of FIG. 7 is a diagram representing combined output voltage CVa.

As indicated by the following equation, combined output voltage CVa is a voltage in which boost voltage TVa generated by single-phase inverter 10-*a* is superimposed on U-phase output voltage V_a of three-phase three-level inverter 5.

$$CVa=V\_a+TVa \tag{B4}$$

Part (b) of FIG. 7 is a diagram representing combined output voltage CVb.

As indicated by the following equation, combined output voltage CVb is a voltage in which boost voltage TVb generated by single-phase inverter 10-*b* is superimposed on V-phase output voltage V_b of three-phase three-level inverter 5.

$$CVb=V\_b+TVb \tag{B5}$$

Part (c) of FIG. 7 is a diagram representing a line voltage DVab.

As indicated by the following equation, line voltage DVab represents a difference between combined output voltage CVa and combined output voltage CVb.

$$DVab=CVa-CVb \tag{B6}$$

Although not shown, line voltage DVbc represents a difference between combined output voltage CVb and combined output voltage CVc. Line voltage DVca represents a difference between combined output voltage CVc and combined output voltage CVa.

Figure 8:
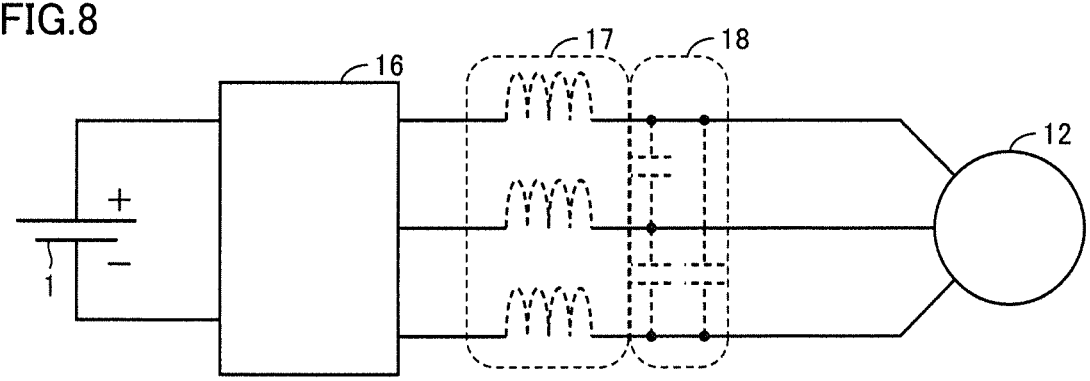
FIG. 8 is a diagram representing line inductances generated in lines between power conversion device 500 and load 12, and stray capacitances between the lines.

FIG. 8 is a diagram representing line inductances generated in lines between power conversion device 500 and load 12 and stray capacitances between the lines.

The long lines between power conversion device 500 and load 12 can be represented as an LC equivalent circuit that is configured of a line inductance 17 and a stray capacitance 18 between the lines and between the motor windings.

Figure 9:
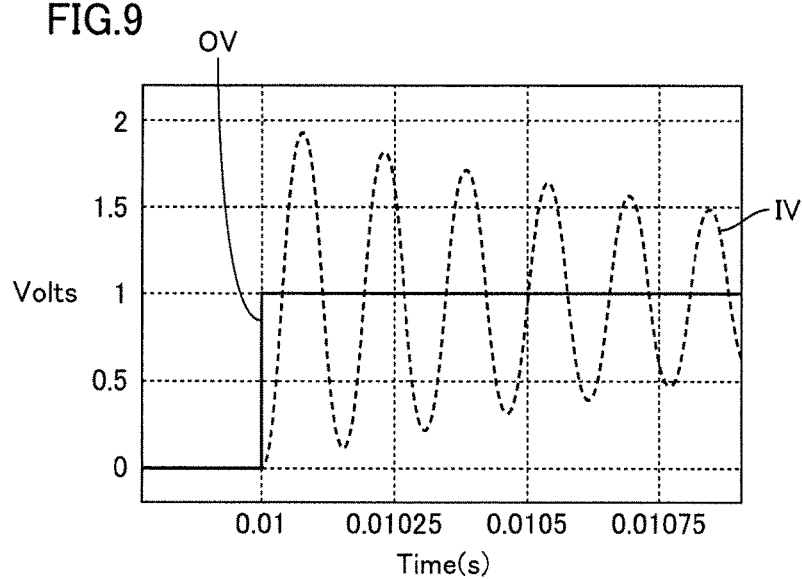
FIG. 9 is a diagram representing a waveform OV of a line voltage between output voltages of power conversion device 500 at an output end, and a waveform IV of a voltage of a load 12 at an input end.

FIG. 9 is a diagram representing a waveform OV of a line voltage between output voltages of power conversion device 500 at an output end, and a waveform IV of a voltage of load 12 at an input end.

As shown in FIG. 9, it is known that, as the line voltages DVab, DVbc, and DVca between output voltages (i.e., combined output voltages CVa, CVb, and CVc) of power conversion device 500 at an output end change, a voltage up to twice the variation ranges of line voltages DVab, DVbc, and DVca between the output voltages (i.e., combined output voltages CVa, CVb, and CVc) is applied to an input end of load 12. The variation ranges of line voltages DVab, DVbc, and DVca between combined output voltages CVa, CVb, and CVc and the normal mode noise level are substantially in proportion to each other. Thus, suppressing the variation ranges of line voltages DVab, DVbc, and DVca between combined output voltages CVa, CVb, and CVc reduces the normal mode noise level. As a result, a normal mode noise filter can be reduced in size. In the present embodiment, a surge of the inverter and the normal mode noise can be suppressed by suppressing the variation ranges of line voltages DVab, DVbc, and DVca between combined output voltages CVa, CVb, and CVc.

Figure 10:
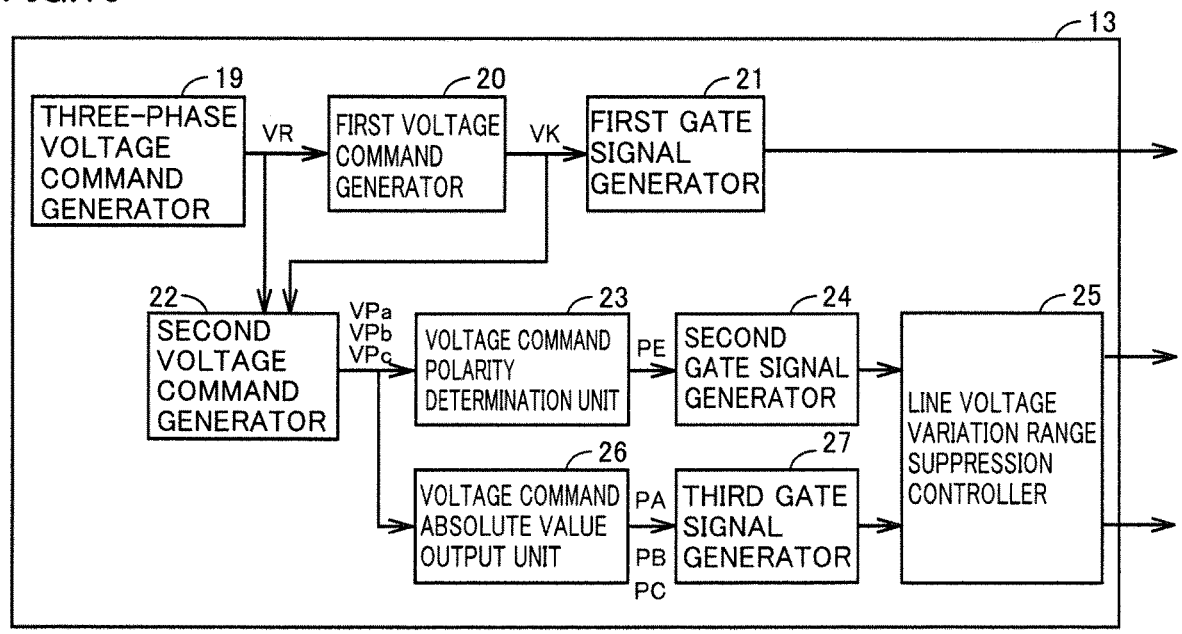
FIG. 10 a diagram representing a configuration of a control device 13 according to Embodiment 3.

FIG. 10 is a diagram representing a configuration of control device 13, according to Embodiment 3.

Control device 13 includes a three-phase voltage command generator 19, a first voltage command generator 20, a first gate signal generator 21, a second voltage command generator 22, a voltage command polarity determination unit 23, a voltage command absolute value output unit 26, a second gate signal generator 24, a third gate signal generator 27, and a line voltage variation range suppression controller 25.

Three-phase voltage command generator 19 generates a three-phase voltage command value VR. For example, three-phase voltage command generator 19 generates three-phase voltage command value VR by performing PI control based on a deviation between the load current of the motor obtained by a current sensor 36 and a current command value. Alternatively, three-phase voltage command generator 19 generates three-phase voltage command value VR by performing PI control based on a deviation between the rpm of the motor obtained by a speed sensor and a speed command value.

First voltage command generator 20 generates a voltage command value VK for three-phase three-level inverter 5. Using three-phase voltage command value VR, first voltage command generator 20 generates voltage command value VK for three-phase three-level inverter 5 that yields common mode voltage Vcom3 for three-phase three-level inverter 5 being 0[V]. Three-phase three-level inverter 5 outputs a low frequency voltage, such as one pulse, two pulses, or three pulses, for each half a cycle. For example, when three-phase voltage command value VR is a sine wave having a peak at 1[V], first voltage command generator 20 sets voltage command value VK to a value other than zero during a period in which the absolute value of three-phase voltage command value VR is 0.5[V] or greater, and sets voltage command value VK to zero in a period in which the absolute value of three-phase voltage command value VR is less than 0.5[V], in order to bring common mode voltage Vcom3 to be 0[V].

Based on voltage command value VK for three-phase three-level inverter 5 generated by first voltage command generator 20, first gate signal generator 21 generates a gate signal CT1 to be sent to switching elements 4 of three-phase three-level inverter 5.

Second voltage command generator 22 generates voltage command values VPa, VPb, and VPc for single-phase inverters 10-a, 10-b, and 10-c. Second voltage command generator 22 generates voltage command values VPa, VPb, and VPc for single-phase inverters 10-a, 10-b, and 10-c by calculating a difference between three-phase voltage command value VR and voltage command value VK for three-phase three-level inverter 5.

Single-phase inverters 10-a, 10-b, and 10-c each include a leg L on the three-phase three-level inverter 5 side and a leg R on the load 12 side.

Voltage command polarity determination unit 23 and second gate signal generator 24 generate a gate signal directed to switching elements included in leg L. Voltage command absolute value output unit 26 and third gate signal generator 27 generate a gate signal directed to switching elements included in leg R. The gate signal directed to the switching elements included in the lower arm of each leg is an inverted version of the gate signal that is directed to the switching elements included in the upper arm of each leg.

Voltage command polarity determination unit 23 outputs polarity determination signals PE for voltage command values VPa, VPb, and VPc for single-phase inverters 10-a, 10-b, and 10-c. Polarity determination signal PE indicates "1" when the polarity of a voltage command value is positive, and indicates "0" when the polarity of a voltage command value is negative.

Voltage command absolute value output unit 26 outputs absolute values PA of voltage command values VPa, VPb, and VPc for single-phase inverters 10-a, 10-b, and 10-c.

Second gate signal generator 24 adds dead times to polarity determination signals PE for voltage command values VPa, VPb, and VPc for single-phase inverters 10-a, 10-b, and 10-c, and outputs gate signals directed to legs L of single-phase inverters 10-a, 10-b, and 10-c on the three-phase three-level inverter 5 side. A dead time is an on-delay time (in general, a several μsec). The dead time is added to polarity determination signal PE when the gate signal for controlling switching elements changes from off to on.

Third gate signal generator 27 compares absolute values PA, PB, and PC of voltage command values VPa, VPb, and VPc for single-phase inverters 10-a, 10-b, and 10-c with triangular wave carriers of respective phases, thereby performing pulse width modulation (PWM) on absolute values PA, PB, and PC of voltage command values VPa, VPb, and VPc, and further adds a dead time to the pulse with modulated PA, PB, and PC and outputs the gate signals directed to legs R of single-phase inverters 10-a, 10-b, and 10-c on the load side. The triangular wave carrier of each phase has a phase difference from the other two triangular wave carriers by 120 degrees.

FIG. 11 is a diagram for illustrating variation ranges of the line voltages not having through a line voltage variation range suppression control. FIG. 12 is a diagram for illustrating variation ranges of the line voltages having through the line voltage variation range suppression control.

FIGS. 11 and 12 show boost voltages TVa, TVb, and TVc generated by single-phase inverters 10-a, 10-b, and 10-c, line voltages EVab, EVbc, and EVca between boost voltages TVa, TVb, and TVc, and line voltage variation ranges ΔEVab, ΔEVbc, and ΔEVca, at a moment. Line voltage variation ranges ΔEVab, ΔEVbc, and ΔEVca represent differences between line voltages EVab(t), EVbc(t), and EVca(t) at the current time t and line voltages EVab(t−1), EVbc(t−1), EVca(t−1), respectively, at the previous time (t−1).

Suppose that first voltage VM is 2[p.u], and second voltage Vs is 1[p.u]. Suppose that (U-phase voltage V_a, V-phase voltage V_b, W-phase voltage V_c) of three-phase three-level inverter 5 is (2, 0, −2).

As shown in FIG. 11, without the line voltage variation range suppression control, single-phase inverters 10-a, 10-b, and 10-c transition from a state 1 (0, 1, 0) to a state 2 (0, 0, 1), resulting in line voltage variation range ΔEbc being 2[p.u].

As shown in FIG. 12, with the line voltage variation range suppression control, single-phase inverters 10-a, 10-b, and 10-c transition from state 1 (0, 1, 0) to state 2 (0, 0, 1) through a state 1A (0, 0, 0). This yields line voltage variation ranges ΔEVab, ΔEVbc, and ΔEVca being up to 1[p.u]. Thus, line voltage variation ranges ΔEVab, ΔEVbc, and ΔEVca can be controlled to a minimum.

Line voltage variation range suppression controller 25 coordinates the timing at which a gate signal is output from second gate signal generator 24 and the timing at which a gate signal is output from third gate signal generator 27, thereby controlling single-phase inverters 10-a, 10-b, and 10-c so that two or more of single-phase inverters 10-a, 10-b, and 10-c do not simultaneously switch switching elements 6. This can suppress the line voltage variation ranges to second voltage Vs or below.

While only one example has been illustrated for ease of description, the line voltage variation range suppression control is applied throughout one cycle of the output voltage.

Figure 13:
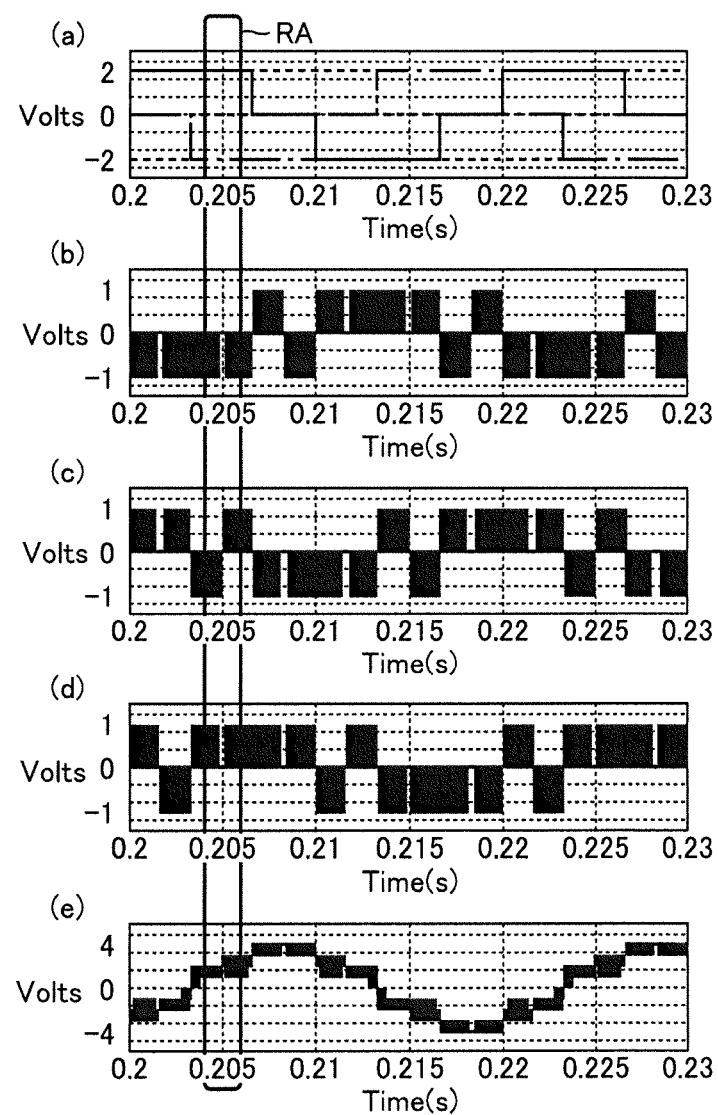
FIG. 13 shows: (a) a diagram representing U-phase output voltage V_a, V-phase output voltage V_b, and W-phase output voltage V_c of three-phase three-level inverter 5; (b) a diagram representing boost voltage TVa generated by single-phase inverter 10-a; (c) a diagram representing boost voltage TVb generated by a single-phase inverter 10-b; (d) a diagram representing boost voltage TVc generated by a single-phase inverter 10-c; and (e) a diagram representing a line voltage EVca between boost voltage TVc generated by single-phase inverter 10-c and boost voltage TVa generated by single-phase inverter 10-a.

Part (a) of FIG. 13 is a diagram representing U-phase output voltage V_a, V-phase output voltage V_b, and W-phase output voltage V_c of three-phase three-level inverter 5. Part (b) of FIG. 13 is a diagram representing boost voltage TVa generated by single-phase inverter 10-*a*. Part (c) of FIG. 13 is a diagram representing boost voltage TVb generated by single-phase inverter 10-*b*. Part (d) of FIG. 13 is a diagram representing boost voltage TVc generated by single-phase inverter 10-*c*. Part (e) of FIG. 13 is a diagram representing a line voltage EVca between boost voltage TVc generated by single-phase inverter 10-*c* and boost voltage TVa generated by single-phase inverter 10-*a*.

Figure 14:
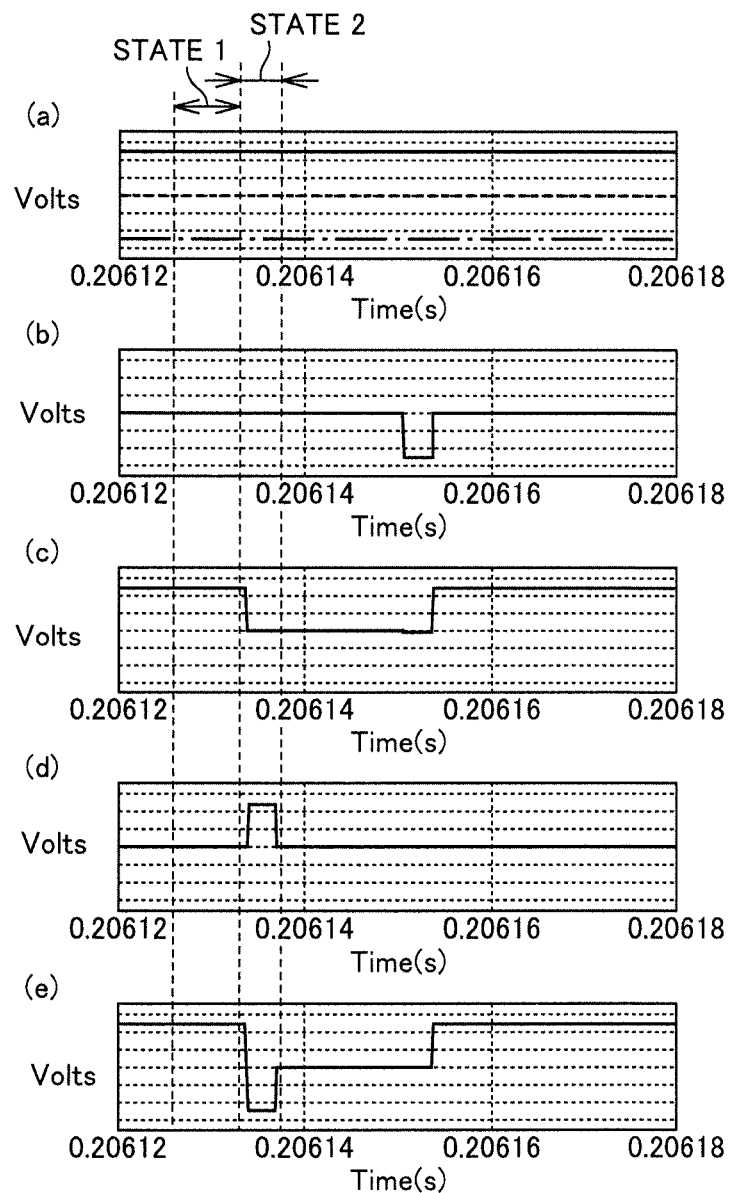
FIG. 14 shows enlarged views (a) through (e) of ranges RA of (a) through (e) of FIG. 13.
Figure 15:
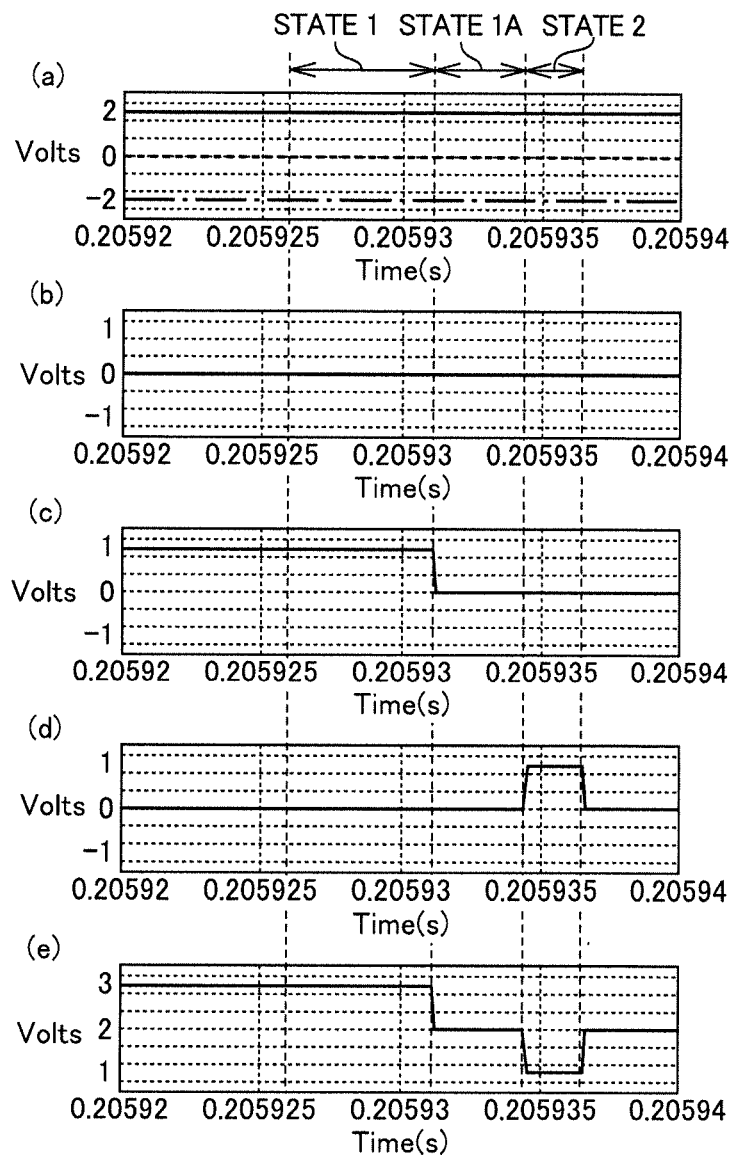
FIG. 15 shows enlarged views (a) through (e) of ranges RA of (a) through (e) of FIG. 13.

Parts (a) through (e) of FIG. 14 and (a) through (e) of FIG. 15 are enlarged views of ranges RA of (a) through (e) of FIG. 13.

FIG. 14 represents example waveforms directly transitioning from state 1 to state 2. FIG. 15 represents example waveforms transitioning from state 1 to state 2 through state 1A. Comparing FIGS. 14 and 15, one may notice that the variation range of line voltage EVca is smaller when the waveform transitions from state 1 to state 2 through state 1A, than when the waveform transitions directly from state 1 to state 2.

As described above, three-phase three-level inverter 5 suppresses the common mode voltage, and single-phase inverters 10-*a*, 10-*b*, and 10-*c* suppress the line voltage variation ranges, thereby achieving reduction in both common mode noise and normal mode noise. As a result, a common mode noise filter and a normal mode noise filter can be reduced in size, and reduction in losses and cost of power conversion device 500 can be expected.

Next, improvement in control performance of the present embodiment will be described.

FIG. 16 is a diagram representing output states of the three phases of three-phase three-level inverter 5, output states in a stationary coordinate system, and common mode voltage Vcom1.

The output states of the three phases of three-phase three-level inverter 5 are states of U-phase output voltage V_a, V-phase output voltage V_b, and W-phase output voltage V_c of three-phase three-level inverter 5.

The output states in the stationary coordinate system are instantaneous spatial voltage vectors represented on a stationary coordinate axis ($\alpha$, $\beta$), which are obtained by performing three-phase to two-phase conversion on voltages V_a, V_b, and V_c of the three phases.

FIG. 17 is a diagram representing output states of the three phases of single-phase inverters 10-*a*, 10-*b*, and 10-*c*, output states in stationary coordinate system, and common mode voltage Vcom2.

The output states of the three phases of single-phase inverters 10-*a*, 10-*b*, and 10-*c* are respective states of boost voltage TVa generated by single-phase inverter 10-*a*, boost voltage TVb generated by single-phase inverter 10-*b*, and boost voltage TVc generated by single-phase inverter 10-*c*.

The output states in the stationary coordinate system are instantaneous spatial voltage vectors represented on a stationary coordinate axis ($\alpha$, $\beta$) obtained by performing three-phase to two-phase conversion on voltages TVa, TVb, and TVc of the three phases.

Three-phase three-level inverter 5 outputting "1" indicates that first voltage VM is output. Single-phase inverters 10-*a*, 10-*b*, and 10-*c* outputting "1" indicates that second voltage Vs is output.

Figure 18:
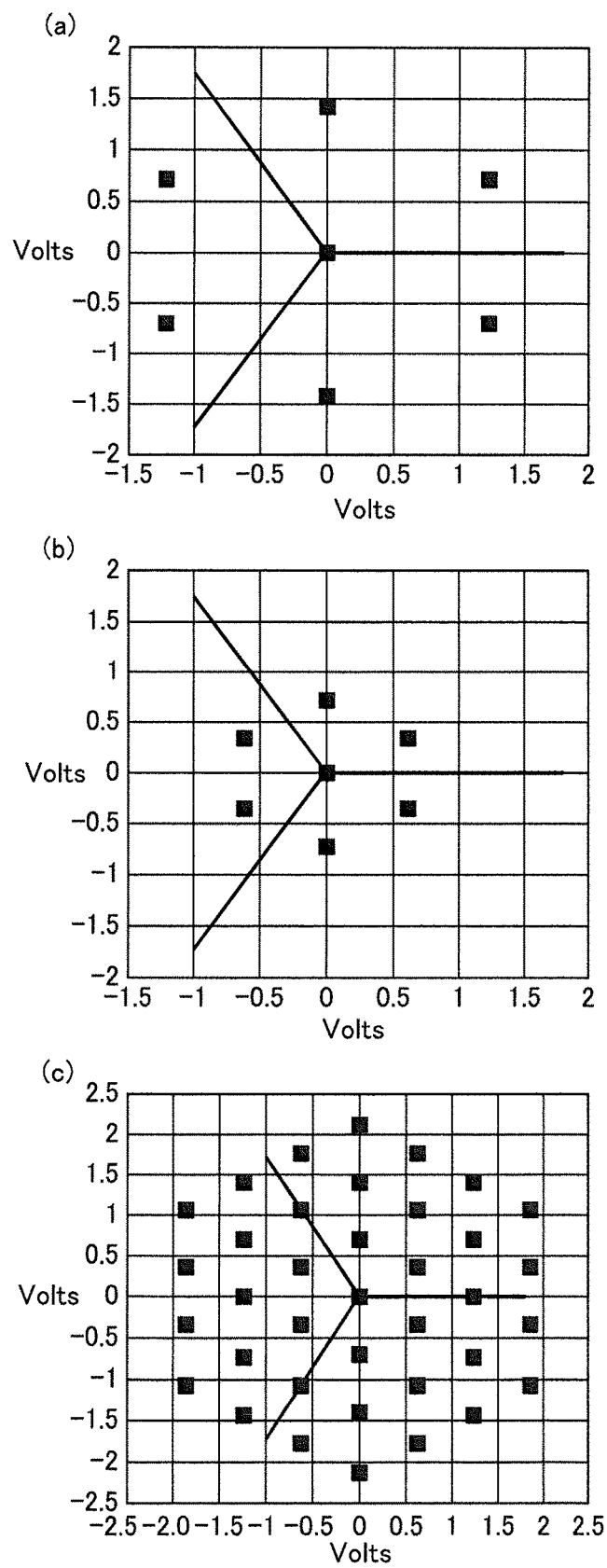
FIG. 18 shows: (a) a diagram representing voltage vectors obtained by performing three-phase to two-phase conversion on output voltages V_a, V_b, and V_c of a three-phase three-level inverter disclosed in PTL 1; (b) a diagram representing voltage vectors obtained by performing three-phase to two-phase conversion on boost voltages TVa, TVb, and TVc generated by three single-phase inverters disclosed in PTL 1; and (c) a diagram representing voltage vectors obtained by performing three-phase to two-phase conversion on combined output voltages CVa, CVb, and CVc in PTL 1.

Part (a) of FIG. 18 is a diagram representing voltage vectors obtained by performing three-phase to two-phase conversion on output voltages V_a, V_b, and V_c of a three-phase three-level inverter disclosed in PTL 1. Part (b) of FIG. 18 is a diagram representing voltage vectors obtained by performing three-phase to two-phase conversion on boost voltages TVa, TVb, and TVc generated by three single-phase inverters disclosed in PTL 1. Part (c) of FIG. 18 is a diagram representing voltage vectors obtained by performing three-phase to two-phase conversion on combined output voltages CVa, CVb, and CVc in PTL 1.

Figure 19:
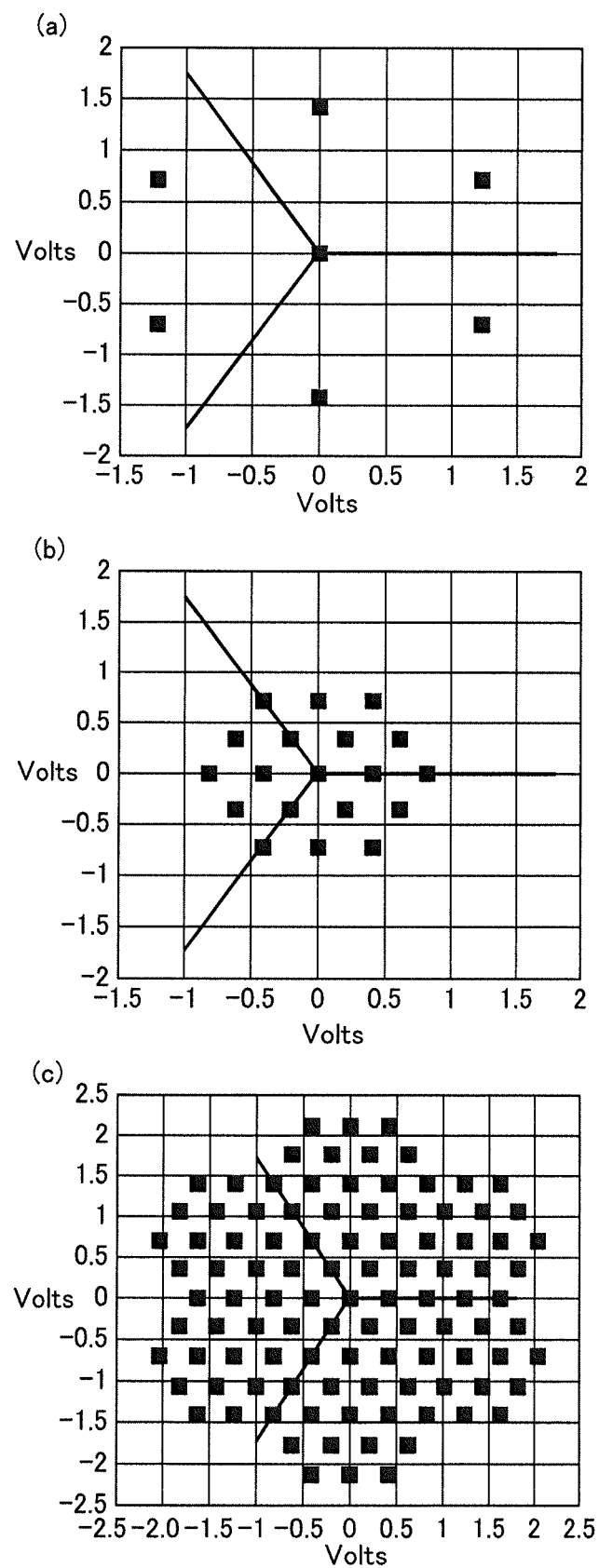
FIG. 19 shows: (a) a diagram representing voltage vectors obtained by performing three-phase to two-phase conversion on output voltages V_a, V_b, and V_c of a three-phase three-level inverter 5 according to Embodiment 3; (b) a diagram representing voltage vectors obtained by performing three-phase to two-phase conversion on boost voltages TVa, TVb, and TVc generated by single-phase inverters 10-a, 10-b, and 10-c, according to Embodiment 3; and (c) a diagram representing voltage vectors obtained by performing three-phase to two-phase conversion on combined output voltages CVa, CVb, and CVc, according to Embodiment 3.

Part (a) of FIG. 19 is a diagram representing voltage vectors obtained by performing three-phase to two-phase conversion on output voltages V_a, V_b, and V_c of three-phase three-level inverter 5, according to Embodiment 3. Part (b) of FIG. 19 is a diagram representing voltage vectors obtained by performing three-phase to two-phase conversion on boost voltages TVa, TVb, and TVc generated by single-phase inverters 10-*a*, 10-*b*, and 10-*c*, according to Embodiment 3. Part (c) of FIG. 19 is a diagram representing voltage vectors obtained by performing three-phase to two-phase conversion on combined output voltages CVa, CVb, and CVc, according to Embodiment 3.

Only some of vectors are shown in (c) of FIG. 18, (b) of FIG. 19, and (c) of FIG. 19.

As shown in FIGS. 16 and 17, there are, in total, 27 possible output states for each of three-phase three-level inverter 5 and single-phase inverters 10-*a*, 10-*b*, and 10-*c*, among which seven possible zero vectors are present in which the common mode voltage is 0[V].

Output power supplied from power conversion device 500 to load 12 is combined output voltages CVa, CVb, and CVc in which output voltages V_a, V_b, and V_c of three-phase three-level inverter 5 and boost voltages TVa, TVb, and TVc generated by single-phase inverters 10-*a*, 10-*b*, and 10-*c* are summed. Accordingly, the end points of the vectors of output voltages V_a, V_b, and V_c of three-phase three-level inverter 5 are the start points of the vectors of boost voltages TVa, TVb, and TVc generated by single-phase inverters 10-*a*, 10-*b*, and 10-*c*. The end points of the vectors of boost voltages TVa, TVb, and TVc generated by single-phase inverters 10-*a*, 10-*b*, and 10-*c* are combined output voltages CVa, CVb, and CVc.

Thus, the number of output states of power conversion device 500 is a product of the number of output states of three-phase three-level inverter 5 and the number of output states of single-phase inverters 10-*a*, 10-*b*, and 10-*c*.

In PTL 1, the three-phase three-level inverter and the single-phase inverters both select zero vectors only, as shown in FIG. 18. Due to the constraint that only zero vectors have to be selected in order to control the common mode voltage to be 0[V], the number of voltage vectors that can be selected as combined output voltages is limited. In PTL 1, since the three-phase three-level inverter and the single-phase inverters both select zero vectors only, the three-phase three-level inverter and the single-phase inverters each output seven possible voltage vectors. Accordingly, 7×7=49 possible voltage vectors are selectable as the vectors of combined output voltages CVa, CVb, and CVc.

As shown in FIG. 19, in the present embodiment, three-phase three-level inverter 5 can select only zero vectors, and single-phase inverters 10-*a*, 10-*b*, and 10-*c* can select all vectors. In the present embodiment, three-phase three-level inverter 5, since it selects zero vectors only, output seven possible voltage vectors. Single-phase inverters 10-*a*, 10-*b*, and 10-*c*, since they have no constraints on selection of zero vectors, output 27 possible voltage vectors. Accordingly, 7×27=189 possible voltage vectors are selectable as the vectors of combined output voltages CVa, CVb, and CVc.

Accordingly, in the present embodiment, control device 13 selects voltage vectors of the phase voltages of three-phase three-level inverter 5 from among seven types of zero vectors which bring the common mode voltage to be 0[V], and selects voltage vectors of three single-phase inverters 10-a, 10-b, and 10-c from among 27 types of voltage vectors. In other words, first voltage command generator 20 generates voltage command value VK that is based on the voltage vectors selected from among the seven types of zero vectors, and second voltage command generator 22 generates voltage command values VPa, VPb, and VPc that are based on the voltage vectors selected from among the 27 types of voltage vectors.

As described above, in the present embodiment, since the number of vectors that can be selected for the combined output voltages is more than PTL 1, the control performance of the power conversion device is improved.

Variation of Embodiment 3

Embodiment 3 has been described with reference to the control device selecting the voltage vectors of the output voltage of three-phase multilevel inverter 5 from among X types of voltage vectors, and selecting the voltage vectors of the boost voltages generated by three single-phase inverters 10-a, 10-b, and 10-c from among Y (Y>X) types of voltage vectors.

In other words, in Embodiment 3, three-phase multilevel inverter 5 selects vectors that bring common mode voltage Vcom1 to be 0[V], and three single-phase inverters 10-a, 10-b, and 10-c connected in series select all vectors. Consequently, an example has been illustrated in which common mode voltage Vcom1 of three-phase multilevel inverter 5 is 0[V], and common mode voltage Vcom2 for three single-phase inverters 10-a, 10-b, and 10-c connected in series is ±⅔[V] or below, and combined common mode voltage Vcom3 is ±⅔[V] or below.

As other example, for example, three-phase multilevel inverter 5 may select vectors that bring common mode voltage Vcom1 to be ±⅓[V], and three single-phase inverters 10-a, 10-b, and 10-c connected in series may select vectors that bring common mode voltage Vcom2 to be ±⅔[V] or below. As a result, common mode voltage Vcom1 for three-phase multilevel inverter 5 is ±⅓[V], common mode voltage Vcom2 for three single-phase inverters 10-a, 10-b, and 10-c connected in series is ±⅔[V] or below, and combined common mode voltage Vcom3 is ±⅔[V] or below.

Embodiments 4

Figure 20:
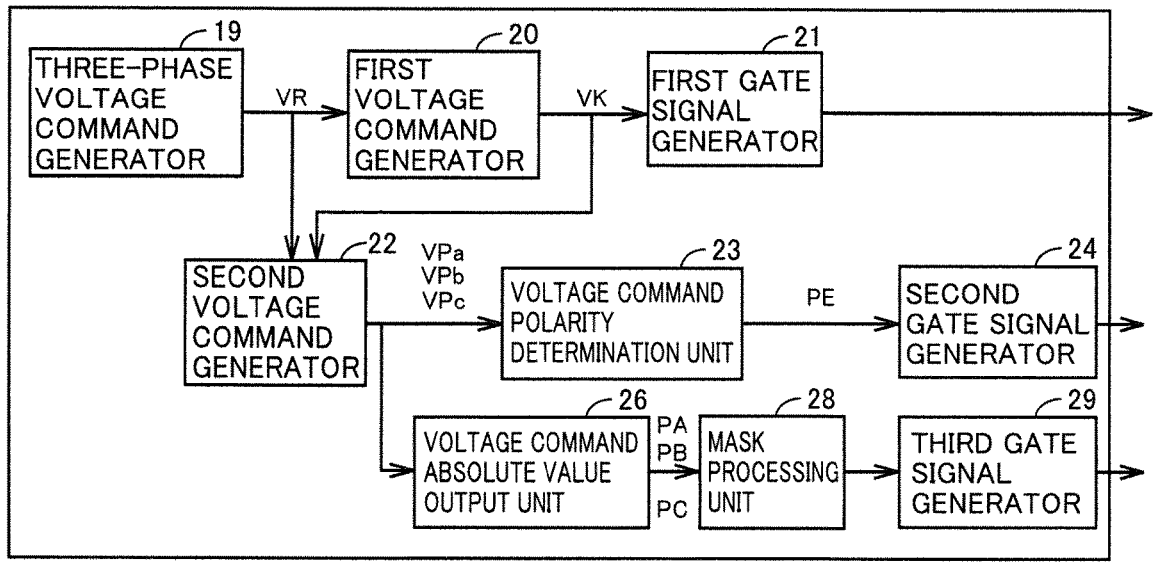
FIG. 20 is a diagram representing a configuration of a control device 13 according to Embodiments 4.

FIG. 20 is a diagram representing a configuration of a control device 13 according to Embodiments 4.

Control device 13 according to Embodiments 4 is the same as control device 13 according to Embodiment 3, except for the following.

Control device 13 according to Embodiment 4 includes a mask processing unit 28 and a third gate signal generator 29, instead of third gate signal generator 27 and line voltage variation range suppression controller 25.

Mask processing unit 28 receives absolute values PA, PB, and PC of voltage command values VPa, VPb, and VPc for single-phase inverters 10-a, 10-b, and 10-c. If absolute values PA, PB, and PC of voltage command values VPa, VPb, and VPc of single-phase inverters 10-a, 10-b, and 10-c are out of a defined range, mask processing unit 28 outputs absolute values PA, PB, and PC of voltage command values VPa, VPb, and VPc. If absolute values PA, PB, and PC of voltage command values VPa, VPb, and VPc of single-phase inverters 10-a, 10-b, and 10-c are within the defined range, mask processing unit 28 outputs defined values, instead of absolute values PA, PB, and PC, so that the variation ranges of line voltages EVab, EVbc, and EVca between combined output voltages CVa, CVb, and CVc are second voltage Vs.

Specifically, the defined range includes one or more continuous ranges. If absolute values PA, PB, and PC of voltage command values VPa, VPb, and VPc of single-phase inverters 10-a, 10-b, and 10-c are within a certain continuous range, mask processing unit 28 uses a minimum value of the certain continuous range, instead of absolute values PA, PB, and PC.

For example, the defined range includes a first continuous range A (0.02 to 0.2) and a second continuous range B (0.5 to 0.75). If absolute values PA, PB, and PC of voltage command values VPa, VPb, and VPc of single-phase inverters 10-a, 10-b, and 10-c are within first continuous range A, mask processing unit 28 outputs a minimum value (0.02) of first continuous range A. If absolute values PA, PB, and PC of voltage command values VPa, VPb, and VPc of single-phase inverters 10-a, 10-b, and 10-c are within second continuous range B, mask processing unit 28 outputs a minimum value (0.5) of second continuous range B through the mask process.

Third gate signal generator 29 compares masked absolute values PA, PB, and PC of voltage command values VPa, VPb, and VPc of single-phase inverters 10-a, 10-b, and 10-c with triangular wave carriers of the respective phases, thereby performing pulse width modulation (PWM) on the masked absolute values PA, PB, and PC of voltage command values VPa, VPb, and VPc, further adds a dead time to the pulse with modulated PA, PB, and PC, and outputs the gate signals directed to legs R of single-phase inverters 10-a, 10-b, and 10-c on the load-side.

Figure 21:
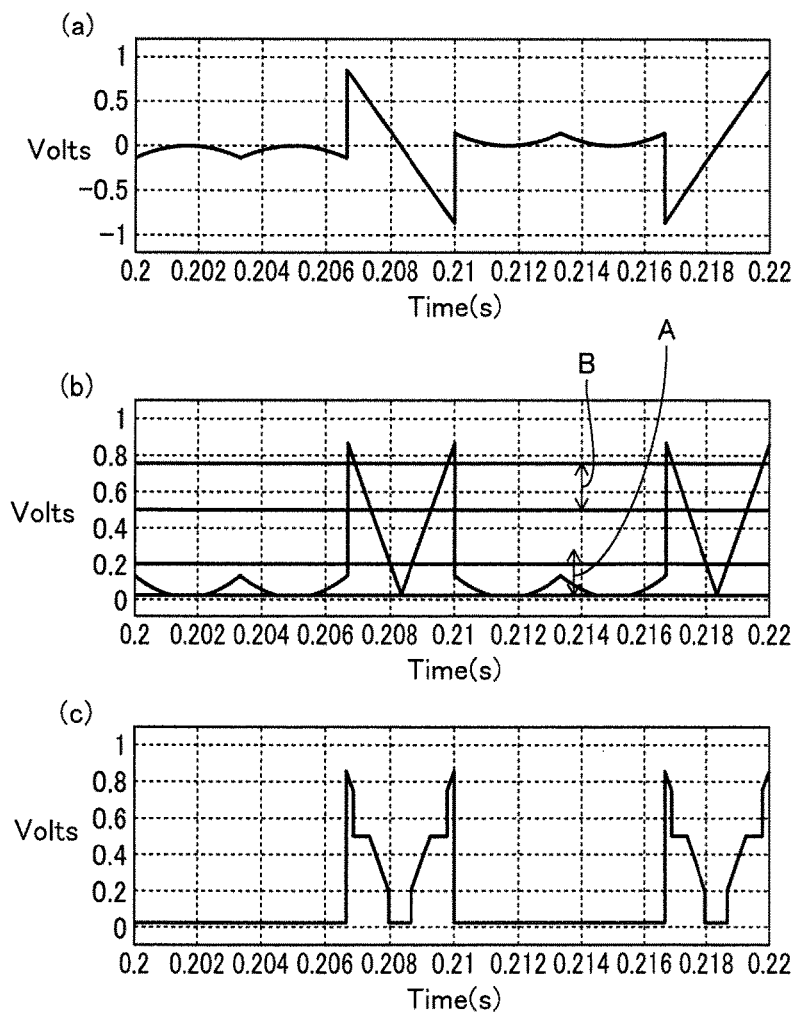
FIG. 21 shows: (a) a diagram representing a voltage command value VPa for a single-phase inverter 10-a; (b) a diagram representing an absolute value PA of voltage command value VPa for single-phase inverter 10-a; and (c) a diagram representing a masked absolute value PA of voltage command value VPa for single-phase inverter 10-a.

Part (a) of FIG. 21 is a diagram representing a voltage command value VPa for single-phase inverter 10-a. Part (b) of FIG. 21 is a diagram representing absolute value PA of voltage command value VPa of single-phase inverter 10-a. In (b) of FIG. 21, first continuous range A and second continuous range B are illustrated. Part (c) of FIG. 21 is a diagram representing masked absolute value PA of voltage command value VPa of single-phase inverter 10-a. If absolute value PA of voltage command value VPa of single-phase inverter 10-a is in first continuous range A (0.02 to 0.2), absolute value PA is set to 0.02, which is the minimum value of first continuous range A. When absolute value PA of voltage command value VPa of single-phase inverter 10-a is in second continuous range B (0.5 to 0.7), absolute value PA is set to 0.5, which is the minimum value of second continuous range B.

Figure 22:
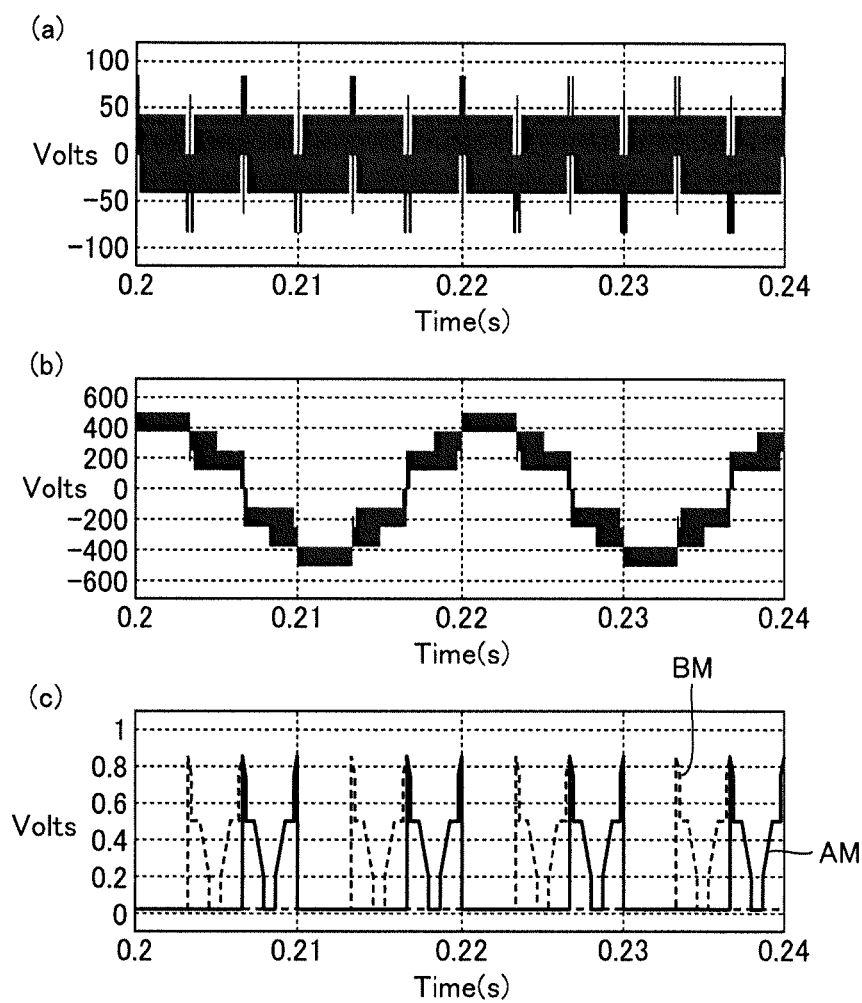
FIG. 22 shows: (a) a diagram representing a common mode voltage Vcom3 of combined output voltages CVa, CVb, and CVc; (b) a diagram representing a line voltage DVab between combined output voltages CVa, CVb, and CVc; (c) a diagram illustrating AM representing a masked absolute value of voltage command value VPa for single-phase inverter 10-a, and BM representing a masked absolute value of voltage command value VPb for a single-phase inverter 10-b.

Part (a) of FIG. 22 is a diagram representing a common mode voltage Vcom3 of combined output voltages CVa, CVb, and CVc. Part (b) of FIG. 22 is a diagram representing a line voltage DVab between combined output voltages CVa, CVb, and CVc. Part (c) of FIG. 22 is a diagram illustrating AM representing masked absolute value PA of voltage command value VPa of single-phase inverter 10-a, and BM representing masked absolute value PB of voltage command value VPb of single-phase inverter 10-b.

Figure 23:
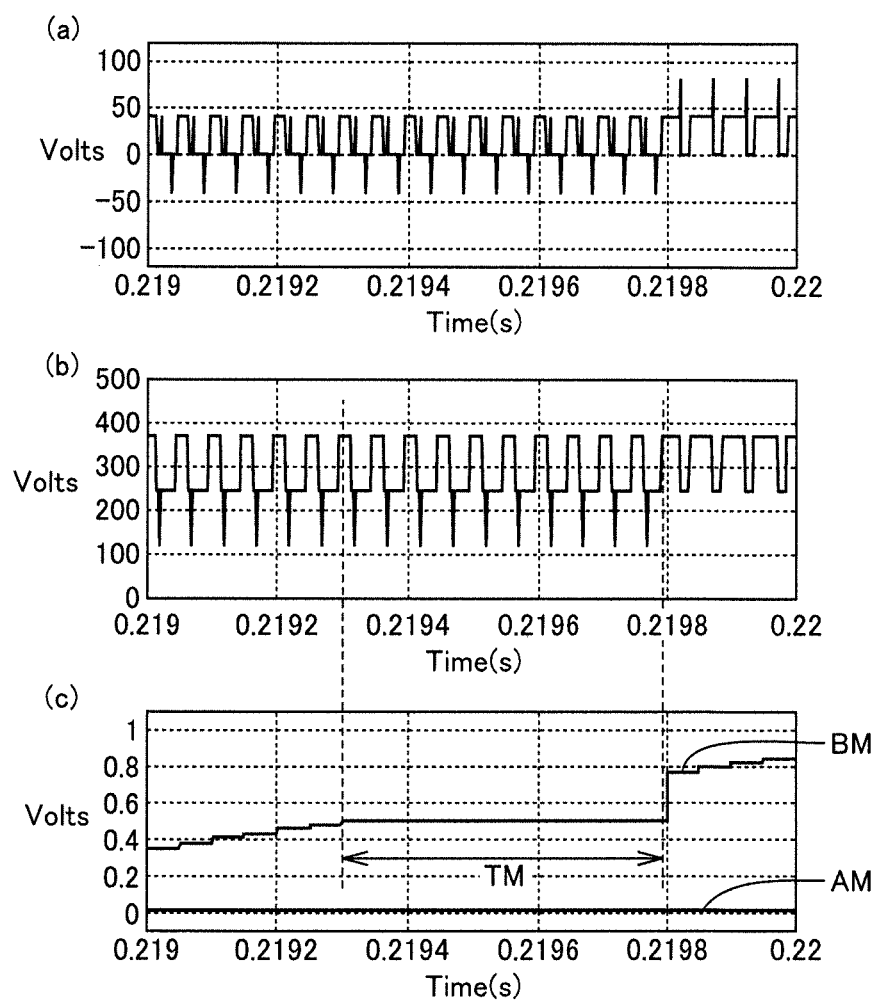
FIG. 23 shows: (a) a view of (a) of FIG. 22 enlarged in the time axis; (b) a view of (b) of FIG. 22 enlarged in the time axis; (c) a view of (c) of FIG. 22 enlarged in the time axis.

Part (a) of FIG. 23 is a view of (a) of FIG. 22 enlarged in the time axis. Part (b) of FIG. 23 is a view of (b) of FIG. 22 enlarged in the time axis. Part (c) of FIG. 23 is a view of (c) of FIG. 22 enlarged in the time axis. Part (c) of FIG. 23 illustrates a period TM during which the mask process is being performed.

Figure 24:
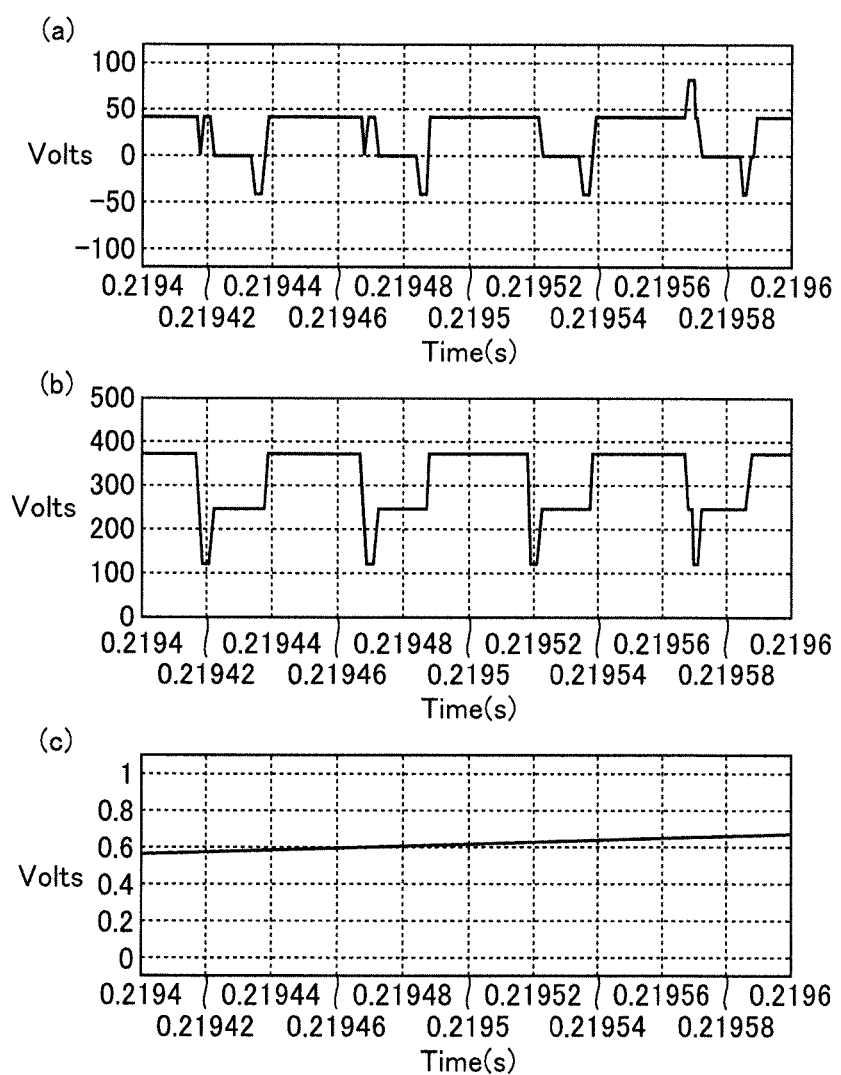
FIG. 24 shows: (a) a diagram representing common mode voltage Vcom3 of combined output voltages CVa, CVb, and CVc not having through a mask process; (b) a diagram representing line voltage DVab between combined output voltages CVa, CVb, and CVc not having through a mask process; and (c) a diagram representing an absolute value PA of voltage command value VPa for single-phase inverter 10-a not having through a mask process.

Part (a) of FIG. 24 is a diagram representing common mode voltage Vcom3 of combined output voltages CVa, CVb, and CVc, without the mask process being performed. Part (b) of FIG. 24 is a diagram representing line voltage DVab between combined output voltages CVa, CVb, and CVc, without the mask process being performed. Part (c) of FIG. 24 is a diagram representing absolute value PA of voltage command value VPa of single-phase inverter 10-a, without the mask process being performed thereon.

Figure 25:
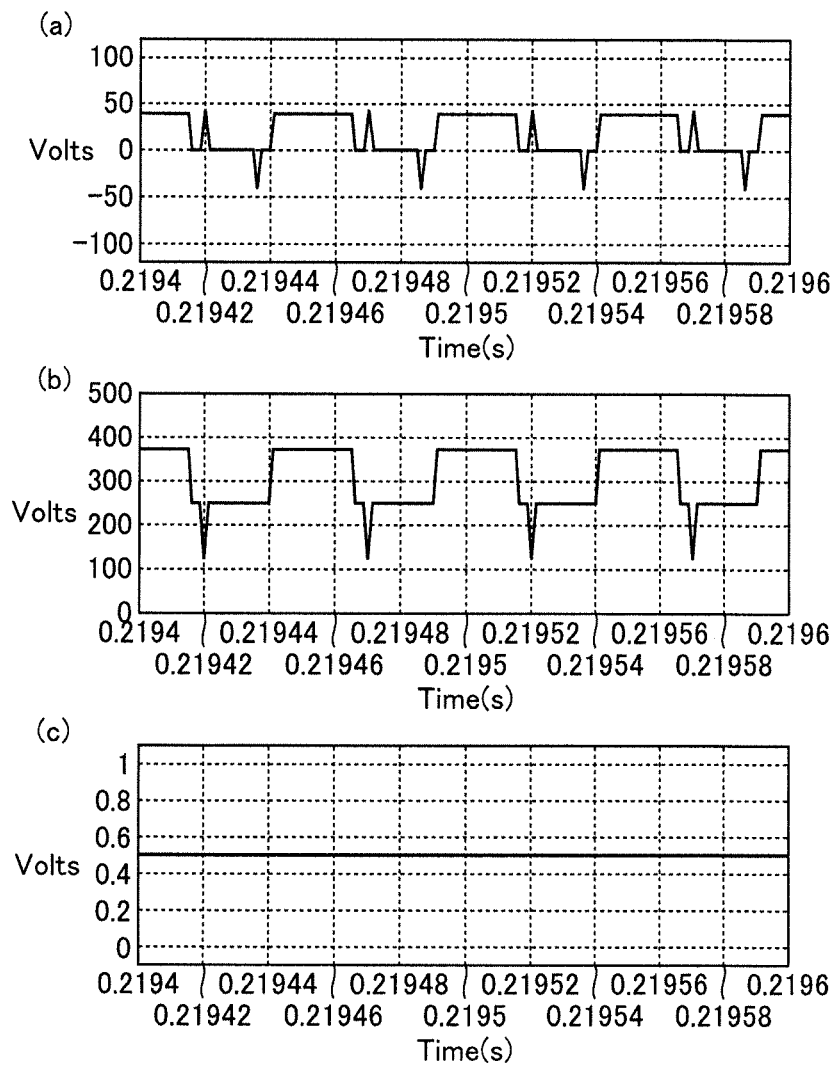
FIG. 25 shows: (a) a diagram representing common mode voltage Vcom3 of combined output voltages CVa, CVb, and CVc when absolute value PA of voltage command value VPa for single-phase inverter 10-a is masked; (b) a diagram representing line voltage DVab between combined output voltages CVa, CVb, and CVc when absolute value PA of voltage command value VPa for single-phase inverter 10-a is masked; and (c) a diagram illustrating AM representing masked absolute value PA of voltage command value VPa for single-phase inverter 10-a.

Part (a) of FIG. 25 is a diagram representing common mode voltage Vcom3 of combined output voltages CVa, CVb, and CVc when absolute value PA of voltage command value VPa for single-phase inverter 10-a is masked. Part (b) of FIG. 25 is a diagram representing line voltage DVab between combined output voltages CVa, CVb, and CVc when absolute value PA of voltage command value VPa for single-phase inverter 10-a is masked. Part (c) of FIG. 25 is a diagram illustrating AM representing masked absolute value PA of voltage command value VPa for single-phase inverter 10-a.

As can be seen from the comparison of the above figures, the mask process can suppress the variation range of line voltage DVab to direct-current voltages of single-phase inverters 10-a, 10-b, and 10-c.

According to the present embodiment, since the line voltage variation ranges can be suppressed only to the direct-current voltages of the single-phase inverters, the normal mode noise can be reduced. As a result, according to the present embodiment, a normal mode noise filter can be reduced in size.

Note that, in the above description, first continuous range A (0.02 to 0.2) and second continuous range B (0.5 to 0.75) respectively include first continuous range A from substantially 0.02 to substantially 0.2, and second continuous range B from substantially 0.5 to substantially 0.75. In other words, the values of the continuous ranges A and B above, even if they have small differences in numerical value, are within the scope of the present invention.

Figure 26:
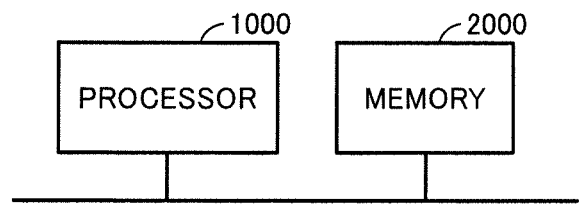
FIG. 26 is a diagram showing a configuration of a power controller in which functionality of a power conversion device 500 is implemented using software.

Operations corresponding to the operations of power conversion device 500 described in Embodiments 1 through 4 may be implemented in hardware or software for a digital circuit. If the functionality of power conversion device 500 is implemented using software, control device 13 can include, for example, a processor 1000 and a memory 2000, as shown in FIG. 26, and processor 1000 can execute programs stored in memory 2000.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

1 Direct-current power supply (first direct-current voltage source); 2, 3 input capacitor; 7, 8, 9 input capacitor (second direct-current voltage source); 4, 6 switching element; 5 three-phase three-level inverter (three-phase multilevel inverter); 10-a, 10-b, 10-c single-phase inverter; 11 EMI noise filter; 12 load; 13 control device; 17 line inductance; 18 stray capacitance; 19 three-phase voltage command generator; 20 first voltage command generator; 21 first gate signal generator; 22 second voltage command generator; 23 voltage command polarity determination unit; 24 second gate signal generator; 25 line voltage variation range suppression controller; 26 voltage command absolute value output unit; 27, 29 third gate signal generator; 28 mask processing unit; 30 computing unit; 31 three-phase three-level inverter gate signal generator; 32 single-phase inverter gate signal generator; 36 current sensor; 37 speed sensor; 500 power conversion device; 1000 processor; 2000 memory; PL positive busbar; and NL negative busbar.

The invention claimed is:

1. A power conversion device, comprising:
 a three-phase multilevel inverter connected to a first direct-current voltage source having a first voltage;
 three single-phase inverters, each single-phase inverter connected in series to a corresponding phase of the three-phase multilevel inverter and including a second direct-current voltage source having a second voltage;
 a common mode noise filter arranged between the three single-phase inverters and a load;
 a current sensor that detects current flowing from each of the three single-phase inverters to the load; and
 a control circuit, wherein
 combined output voltages, which are combinations of boost voltages generated by the three single-phase inverters and output voltages of the three-phase multilevel inverter, are supplied to the load,
 the control circuit adjusts, based on the detected current flowing from each of the three single-phase inverters to the load, a common mode voltage of the combined output voltages to be within a predetermined allowable range, and
 the control circuit adjusts, based on the detected current flowing from each of the three single-phase inverters to the load, a variation range of each line voltage in the combined output voltages to satisfy a specified condition established with the second voltage as a reference.

2. The power conversion device according to claim 1, wherein
 the predetermined allowable range is ⅔ or below the second voltage and the specified condition is that the variation range of each line voltage in the combined output voltages is the second voltage or below.

3. The power conversion device according to claim 2, wherein
 the control circuit controls the common mode voltage of the output voltages of the three-phase multilevel inverter to be 0[V], and controls a variation range of each line voltage between the boost voltages generated by the three single-phase inverters to be a minimum.

4. The power conversion device according to claim 3, wherein
 the control circuit controls two or more of the three single-phase inverters so that the two or more of the three single-phase inverters do not switch simultaneously.

5. The power conversion device according to claim 2, wherein
 the control circuit selects voltage vectors of the output voltages of the three-phase multilevel inverter from among X types of voltage vectors, and selects voltage vectors of the boost voltages generated by the three single-phase inverters from among Y types of voltage vectors, where Y>X.

6. The power conversion device according to claim 5, wherein
 the control circuit selects the voltage vectors of the output voltages of the three-phase multilevel inverter from among seven types of zero vectors, and selects the voltage vectors of the boost voltages generated by the three single-phase inverters from among all 27 types of voltage vectors.

7. The power conversion device according to claim 2, wherein
when an absolute value of a voltage command value for the single-phase inverter is within a defined range, the control circuit uses a defined value, instead of the absolute value of the voltage command value so that a voltage variation range of each line voltage in the combined output voltages is the second voltage.

8. The power conversion device according to claim 7, wherein
the defined range includes one or more continuous ranges, and
when the absolute value of the voltage command value for the single-phase inverter is within a continuous range among the one or more continuous ranges, the control circuit uses a minimum value of the continuous range, instead of the absolute value of the voltage command value.

9. The power conversion device according to claim 8, wherein
the defined range includes
a first continuous range from 0.02 to 0.2 times the second voltage, and
a second continuous range from 0.5 to 0.75 times the second voltage.

10. The power conversion device according to claim 1, wherein
the predetermined allowable range is 0[V], and the specified condition is that a variation range of each line voltage between the boost voltages generated by the three single-phase inverters is twice the second voltage.

11. The power conversion device according to claim 1, wherein
the predetermined allowable range is $1/10$ or below the second voltage, and the specified condition is that the variation range of each line voltage between the boost voltages generated by the three single-phase inverters is twice the second voltage.

12. The power conversion device according to claim 1, wherein
the control circuit generates a three-phase voltage command value based on a deviation between the detected current flowing from each of the three single-phase inverters to the load and a current command value and adjusts, based on the three-phase voltage command value, the common mode voltage of the combined output voltages and the variation range of each line voltage in the combined output voltages.

\* \* \* \* \*